(12) United States Patent
Dave et al.

(10) Patent No.: US 10,786,948 B2
(45) Date of Patent: Sep. 29, 2020

(54) MULTI-SENSOR QUALITY INFERENCE AND CONTROL FOR ADDITIVE MANUFACTURING PROCESSES

(71) Applicant: Sigma Labs, Inc., Santa Fe, NM (US)

(72) Inventors: Vivek R. Dave, Concord, NH (US);
David D. Clark, Santa Fe, NM (US);
Matias Roybal, Santa Fe, NM (US);
Mark J. Cola, Santa Fe, NM (US);
Martin S. Piltch, Los Alamos, NM (US); R. Bruce Madigan, Butte, MT (US); Alberto Castro, Santa Fe, NM (US)

(73) Assignee: SIGMA LABS, INC., Santa Fe, NM (US)

( * ) Notice: Subject to any disclaimer, the term of this patent is extended or adjusted under 35 U.S.C. 154(b) by 523 days.

(21) Appl. No.: 14/945,247

(22) Filed: Nov. 18, 2015

(65) Prior Publication Data

US 2016/0185048 A1    Jun. 30, 2016

Related U.S. Application Data

(60) Provisional application No. 62/235,232, filed on Sep. 30, 2015, provisional application No. 62/185,910,
(Continued)

(51) Int. Cl.
*B29C 64/386* (2017.01)
*B22F 3/105* (2006.01)
(Continued)

(52) U.S. Cl.
CPC .......... *B29C 64/386* (2017.08); *B22F 3/1055* (2013.01); *B29C 64/153* (2017.08);
(Continued)

(58) Field of Classification Search
CPC ..... B33Y 50/02; B29C 64/386; B29C 64/153; B29C 64/393; B22F 3/1055;
(Continued)

(56) References Cited

U.S. PATENT DOCUMENTS 3,499,310 A * 3/1970 Buschfort .............. G01K 15/00
136/233
3,992,615 A   11/1976 Bennett et al.
(Continued)

FOREIGN PATENT DOCUMENTS

EP    1466718 A2   10/2004
EP    3200973 A1   8/2017
(Continued)

OTHER PUBLICATIONS

IBM Technical Disclosure Bulletin, V 29, Issue 11, p. 4870-4872, Apr. 1, 1987 (Year: 1987).*
(Continued)

*Primary Examiner* — James J Lee
*Assistant Examiner* — Shon G Foley
(74) *Attorney, Agent, or Firm* — Kilpatrick Townsend & Stockton LLP

(57)    ABSTRACT

This invention teaches a multi-sensor quality inference system for additive manufacturing. This invention still further teaches a quality system that is capable of discerning and addressing three quality issues: i) process anomalies, or extreme unpredictable events uncorrelated to process inputs; ii) process variations, or difference between desired process parameters and actual operating conditions; and iii) material structure and properties, or the quality of the resultant material created by the Additive Manufacturing process. This invention further teaches experimental observations of the Additive Manufacturing process made only in a Lagrangian frame of reference. This invention even further teaches
(Continued)

the use of the gathered sensor data to evaluate and control additive manufacturing operations in real time.

15 Claims, 28 Drawing Sheets

Related U.S. Application Data filed on Jun. 29, 2015, provisional application No. 62/081,004, filed on Nov. 18, 2014.

(51) Int. Cl.
*B29C 64/153* (2017.01)
*B33Y 50/02* (2015.01)
*G05B 19/418* (2006.01)
*B29C 64/393* (2017.01)

(52) U.S. Cl.
CPC ........ *B33Y 50/02* (2014.12); *G05B 19/41875* (2013.01); *B22F 2003/1057* (2013.01); *B22F 2999/00* (2013.01); *B29C 64/393* (2017.08); *G05B 2219/32194* (2013.01); *Y02P 10/295* (2015.11)

(58) Field of Classification Search
CPC ...... B22F 2003/1057; G05B 19/41875; G05B 2219/32194; Y02P 10/295
See application file for complete search history.

(56) References Cited

U.S. PATENT DOCUMENTS

| | | | |
|---|---|---|---|
| 5,487,011 A | | 1/1996 | Chaiken |
| 5,737,090 A | | 4/1998 | Christopher et al. |
| 5,758,968 A | * | 6/1998 | Diebold ............... G01N 21/534 374/161 |
| 5,962,065 A | | 10/1999 | Weimer et al. |
| 6,633,391 B1 | | 10/2003 | Oluseyi et al. |
| 6,649,310 B2 | | 11/2003 | Itoh et al. |
| 6,930,278 B1 | * | 8/2005 | Chung ................... B23K 26/34 219/121.83 |
| 7,419,632 B2 | * | 9/2008 | Keller ................... B29C 35/002 264/113 |
| 7,627,386 B2 | | 12/2009 | Mo et al. |
| 7,818,129 B2 | | 10/2010 | Staton et al. |
| 8,554,356 B2 | | 10/2013 | Shimizu et al. |
| 9,925,715 B2 | | 3/2018 | Cheverton et al. |
| 2002/0095234 A1 | | 7/2002 | Yoshida |
| 2005/0134188 A1 | | 6/2005 | Lindqvist |
| 2006/0229744 A1 | | 10/2006 | Patzwald et al. |
| 2009/0206065 A1 | * | 8/2009 | Kruth ................... B22F 3/1055 219/121.66 |
| 2010/0098835 A1 | | 4/2010 | Wang et al. |
| 2010/0221012 A1 | | 9/2010 | Awaji |
| 2010/0280666 A1 | | 11/2010 | Marchetto |
| 2011/0155905 A1 | | 6/2011 | Hatakeyama et al. |
| 2012/0051389 A1 | * | 3/2012 | Schalles ............... G01K 15/002 374/1 |
| 2012/0122252 A1 | | 5/2012 | Fujimori |
| 2012/0123581 A1 | | 5/2012 | Smilde et al. |
| 2013/0083324 A1 | * | 4/2013 | Wilhelm ............... G01N 21/274 356/431 |
| 2013/0217154 A1 | | 8/2013 | Fukazawa et al. |
| 2014/0163717 A1 | | 6/2014 | Das et al. |
| 2015/0123320 A1 | * | 5/2015 | Joyce ................... B29O 64/386 264/401 |
| 2015/0147424 A1 | | 5/2015 | Bibas |
| 2015/0177158 A1 | | 6/2015 | Cheverton |
| 2015/0261196 A1 | | 9/2015 | Wilson et al. |
| 2015/0375456 A1 | * | 12/2015 | Cheverton ............ B29C 64/153 264/406 |
| 2016/0005566 A1 | | 1/2016 | Zewail et al. |
| 2016/0176114 A1 | | 6/2016 | Tsai et al. |
| 2016/0236279 A1 | | 8/2016 | Ashton et al. |
| 2016/0332381 A1 | * | 11/2016 | Long ..................... B33Y 30/00 |
| 2017/0113415 A1 | | 4/2017 | Desimone et al. |
| 2018/0036949 A1 | | 2/2018 | Lopez et al. |

FOREIGN PATENT DOCUMENTS

| | | |
|---|---|---|
| EP | 3221076 | 9/2017 |
| WO | 2013021173 A1 | 2/2013 |
| WO | 2013159811 A1 | 10/2013 |
| WO | 2014144255 A2 | 9/2014 |

OTHER PUBLICATIONS

A new approach to the determination of the liquidus and solidus points associated with the melting curve of the eutectic Co-C, taking into account the thermal inertia of the furnace, P Bloembergen, W Dong, H Zhang and T Wang, 2013 Metrologia 50 295 (Year: 2013).*
U.S. Appl. No. 15/282,822, "Notice of Allowance", dated Sep. 28, 2018, 18 pages.
EP15861085.7, "Extended European Search Report", dated Jun. 18, 2018, 7 pages.
Dunsky, "Process Monitoring in Laser Additive Manufacturing", Industrial Laser Solutions for Manufacturing, Sep. 12, 2014, 9 pages.
Gasteuil, et al., "Lagrangian temperature, velocity, and local heat flux measurement in Rayleigh-Benard convection", Physical review letters 99.23, 2007, pp. 1-4.
PCT/US2015/061420, "International Search Report and Written Opinion", dated Feb. 4, 2016, 10 pages.
U.S. Appl. No. 16/234,333, "Corrected Notice of Allowability", dated Apr. 3, 2020, 2 pages.
U.S. Appl. No. 16/234,333, "Notice of Allowance", dated Mar. 10, 2020, 18 pages.
EP15861085.7, "Office Action", dated Dec. 4, 2019, 5 pages.

* cited by examiner

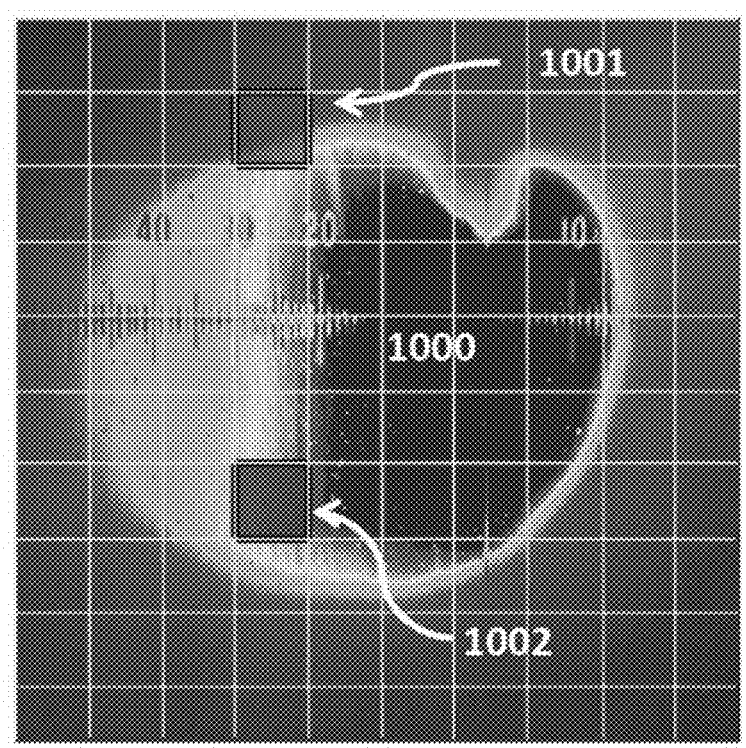
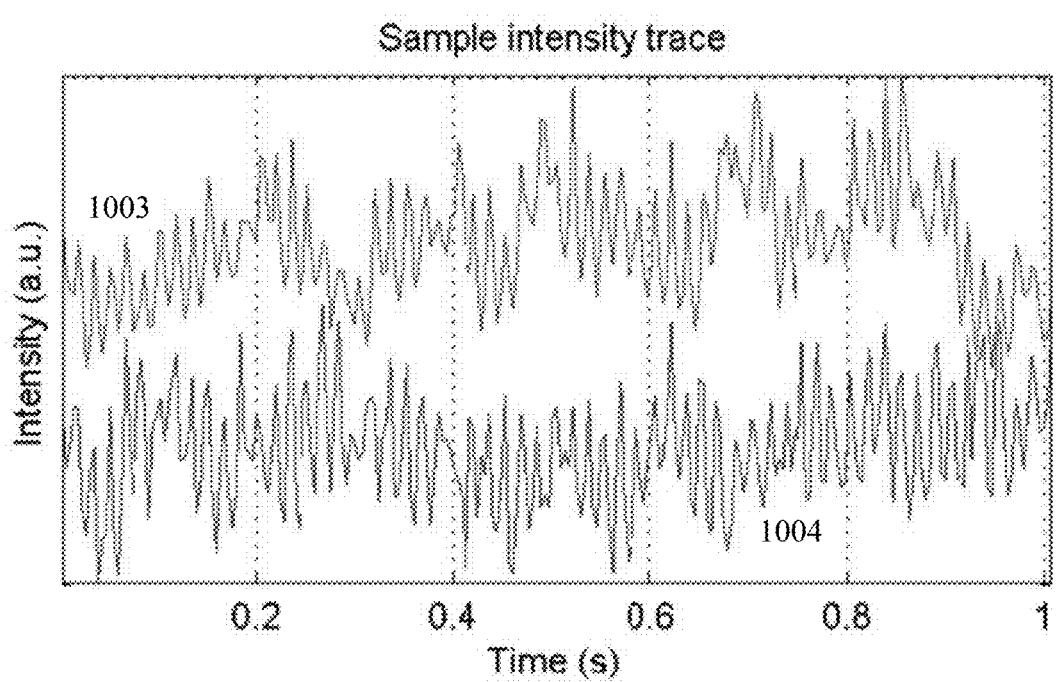
FIG. 10

- 2000 — ENGINEERING END USE ENVIRONMENT
  - Specify Functional and Operational Requirements: the part's function and operation, what pressures and forces must be sustained, etc.

- 2001 — DESIGN INTENT
  - Specify geometric, metallurgical, and mechanical properties of the part that will allow it to function in the End Use Environment

- 2002 — QUALITY SPECIFICATION
  - Specify how physical attributes and/or properties of the part will be inspected or otherwise determined to ensure compliance to Design Intent

- 2003 — INSPECTION PROTOCOLS AND STANDARDS
  - Specify how inspection is to be done using what measurement techniques, calibration standards, etc.

- 2004 — PROCESS QUALIFICATION
  - Traditionally a very lengthy, costly, and time-consuming process that adjusts manufacturing inputs until the output product is capable of producing parts which when inspected using the Inspection Protocols meet the Quality Specification

- 2005 — MANUFACTURING PROCESS SPECIFICATION
  - Based on the results of the Process Qualification, specify a set of manufacturing parameters, inputs, or other conditions that "lock down" the manufacturing process and ensure that the conditions experienced during Process Qualification exist in perpetuity

- 2006 — PROCESS CONTROL
  - Implement administrative measures and/or engineering controls that ensure that the Manufacturing Process Specification is met on an ongoing basis

- 2007 — REAL TIME PROCESS CONTROL
  - This is a subset of Process Control in which the following elements are combined: real-time sensing, rapid decision making and analysis, and real-time adjustment of manufacturing inputs/parameters

MULTI-SENSOR QUALITY INFERENCE AND CONTROL FOR ADDITIVE MANUFACTURING PROCESSES

CROSS-REFERENCES TO RELATED APPLICATIONS

This application claims priority under 35 USC 119(e) to U.S. Provisional Patent Application No. 62/081,004 filed on Nov. 18, 2014, and entitled "MULTI-SENSOR LAGRANGIAN QUALITY INFERENCE FOR ADDITIVE MANUFACTURING PROCESSES," to U.S. Provisional Patent Application No. 62/185,910 filed on Jun. 29, 2015 and entitled "System for Thermal Process Monitoring, Quality Assurance, and Control" and to U.S. Provisional Application No. 62/235,232 filed on Sep. 30, 2015 and entitled "System and Methods for Additive Manufacturing Operations," the disclosures of which are incorporated by reference in their entirety and for all purposes.

BACKGROUND OF THE INVENTION

Additive manufacturing, or the sequential assembly or construction of a part through the combination of material addition and applied energy, takes on many forms and currently exists in many specific implementations and embodiments. Additive manufacturing can be carried out by using any of a number of various processes that involve the formation of a three dimensional part of virtually any shape. The various processes have in common the sintering, curing or melting of liquid, powdered or granular raw material, layer by layer using ultraviolet light, high powered laser, or electron beam, respectively. Unfortunately, established processes for determining a quality of a resulting part manufactured in this way are limited. Conventional quality assurance testing generally involves destruction of the part. While destructive testing is an accepted way of validating a part's quality, as it allows for close scrutiny of various internal portions of the part, such tests cannot for obvious reasons be applied to a production part. Consequently, ways of non-destructively verifying the integrity of a part produced by additive manufacturing is desired.

SUMMARY

The described embodiments are related to a large subcategory of additive manufacturing, which involves using an energy source that takes the form of a moving region of intense thermal energy. In the event that this thermal energy causes physical melting of the added material, then these processes are known broadly as welding processes. In welding processes, the material, which is incrementally and sequentially added, is melted by the energy source in a manner similar to a fusion weld.

When the added material takes the form of layers of powder, after each incremental layer of powder material is sequentially added to the part being constructed, the heat source melts the incrementally added powder by welding regions of the powder layer creating a moving molten region, hereinafter referred to as the weld pool, so that upon solidification they become part of the previously sequentially added and melted and solidified layers below the new layer that includes the part being constructed. As additive machining processes can be lengthy and include any number of passes of the weld pool, it can be difficult to avoid at least slight variations in the size and temperature of the weld pool as the weld pool is used to solidify the part. It should be noted that additive manufacturing processes are typically driven by one or more processors associated with a computer numerical control (CNC) due to the high rates of travel of the heating element and complex patterns needed to form a three dimensional structure.

An additive manufacturing method is disclosed and includes the following: monitoring the temperature of a first portion of a build plane during an additive manufacturing operation with a first optical temperature sensor; monitoring the temperature of a second portion of the build plane that includes the first portion with a second optical temperature sensor; detecting a change in state of material within the first portion as a heat source passes through the first portion of the build plane with the first sensor; calibrating the second sensor by correlating the change in phase detected by the first sensor with information collected by the second sensor during the detected phase change; and changing an amount of heat supplied by the heat source in accordance with the calibrated temperature information provided by the second sensor.

An additive manufacturing system is disclosed and includes the following: a processor; a heat source configured to direct energy towards a layer of powder arranged on a powder bed in a pattern defined by the processor that corresponds to a shape of a part; a first optical sensor configured to determine a temperature associated with a fixed portion of the part; and a second optical sensor configured to receive light emitted by a portion of the layer of powder being melted by the energy from the heat source. The processor is configured to receive sensor data from the first and second optical sensors during an additive manufacturing operation and to calibrate the sensor data by identifying phase changes during an additive manufacturing operation.

An additive manufacturing method is disclosed and includes the following: applying heat to a powder distributed across a powder bed using a heat source; measuring an amount of heat being emitted by a portion of the powder bed with an optical temperature sensor; identifying the time at which the portion of the part undergoes melting and solidifying phase change; calibrating the temperature data retrieved by the optical temperature sensor using the temperature at which the part undergoes the melting phase change and the temperature at which the material making up the metal part is known to melt; and adjusting the amount of heat applied by the heat source in accordance with the calibrated temperature data.

BRIEF DESCRIPTION OF THE DRAWINGS

The disclosure will be readily understood by the following detailed description in conjunction with the accompanying drawings, wherein like reference numerals designate like structural elements, and in which:

FIG. 10 is a similar illustration as FIG. 9 with false color highlighting;

FIG. 20 shows the hierarchy of process control from the highest level requirements down to the lowest level real-time control loop;

DETAILED DESCRIPTION

Figure 1:
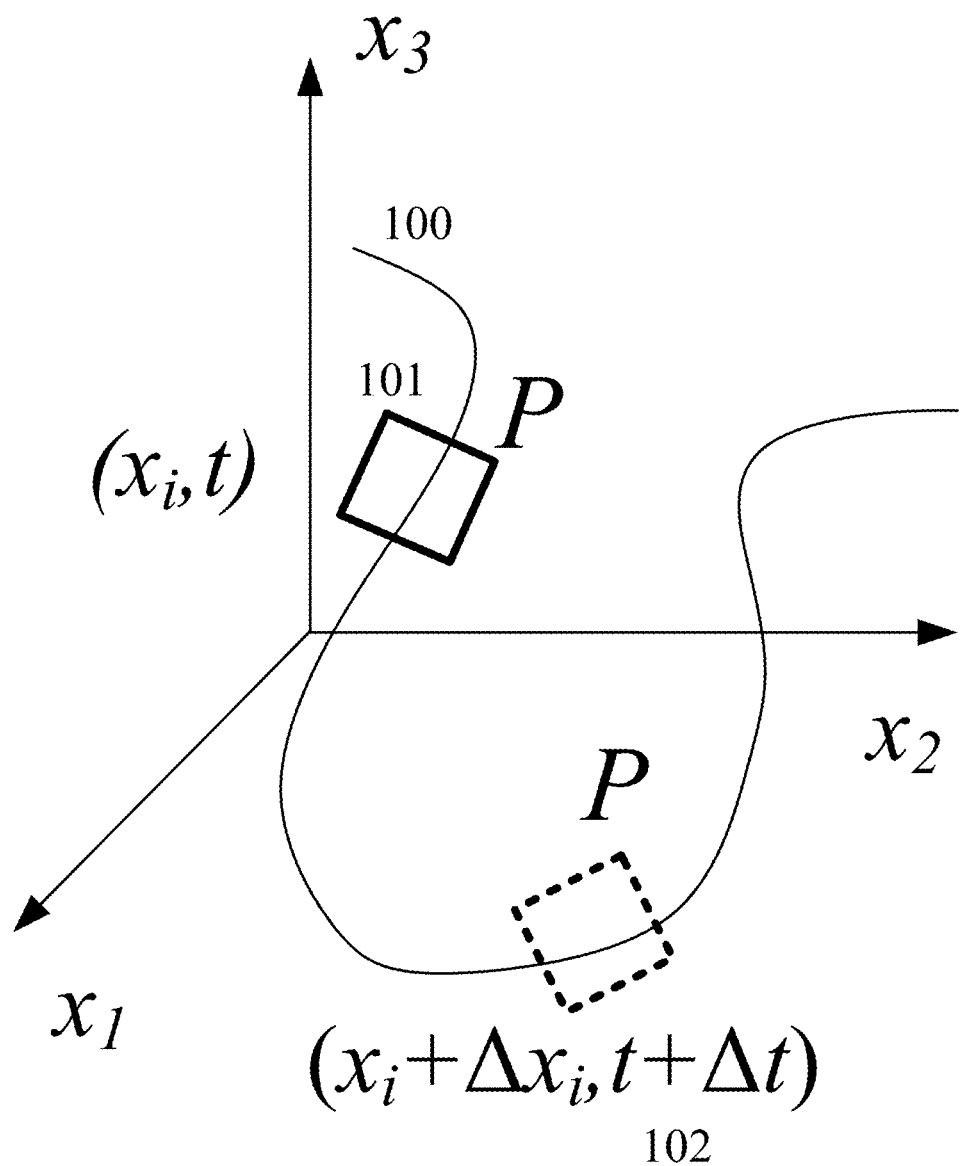
FIG. 1 is a schematic illustration of a Lagrangian path.

In any process in which heat and mass are being transported, it is possible to formulate the fundamental governing equations for the process in one of two reference frames: Eulerian or Lagrangian. A Eulerian frame of reference specifies quantities associated with any transport phenomenon by looking at values associated with specific points in space at given intervals in time. Therefore the point grid in space is fixed, and the medium "flows" through this grid. This is analogous to sitting on a riverbank and watching the river go by. A Lagrangian frame of reference looks at physical quantities associated with the transport phenomenon along lines of flow in the flowfield or in the medium itself, i.e. "moving with" the transport phenomenon. This can be thought of as analogous to sitting in a boat and observing the river as you are moving with the flow of the river. This can be schematically described as shown in FIG. 1. The specific line of flow 100 is a path along which specific physical quantities are to be evaluated in the Lagrangian frame of reference. At a specific location x and time t 101, the specific attribute or physical quantity associated with the transport phenomenon will have a certain value. At a later point x+Δx and time t+Δt, the attribute in question will have yet another value. If we designate the given quantity being measured as a, and we write the scalar representation of the change alone any given direction xi then the change between these two material points is given by:

$$\frac{d\alpha_p}{dt} = \frac{\partial \alpha}{\partial t} + \left(\frac{\partial \alpha}{\partial x_i}\right)\left(\frac{dx_i}{dt}\right)_p = \underbrace{\frac{\partial \alpha}{\partial t}}_{\text{Local change in time}} + \underbrace{\frac{\partial \alpha}{\partial x_i} U_i}_{\text{Change in space}} \quad \text{Eq. (1)}$$

Ui is the flow velocity along the i-th axis. However this is just the change in the quantity as measured in the Eulerian reference frame. The local change in time and space are in the Lagrangian reference frame. Therefore Eq. (1) links the change in any given quantity in the Eulerian reference frame to the change in that quantity in the Lagrangian reference frame.

With respect to Additive Manufacturing processes that involve the creation of a molten pool, the cooling rate at the liquid-solid interface, the thermal gradient at the liquid-solid interface, and the travel velocity of the moving heat source are related by the following equation:

$$\frac{\partial T}{\partial t} = V\frac{\partial T}{\partial x} \quad \text{Eq. (2)}$$

Where $$\frac{\partial T}{\partial t}$$

is the cooling rate at the liquid-solid interface, V is the travel velocity of the moving heat source, and $$\frac{\partial T}{\partial x}$$

is the thermal gradient at the liquid solid interface. It is further assumed that the heat source is moving in the x-direction, or that the choice of direction for the x-axis is chosen such that it is aligned with the direction of movement for the heat source. Furthermore, in many instances associated with Additive Manufacturing, especially those processes involving powder beds that are melted or sintered by moving heat sources, it is found that the thermal gradients are very steep and are typically confined to a region that is immediately adjacent to the melt pool. When we were to estimate the energy source used in Additive Manufacturing as a point source, then the equations for the thermal field are analytically tractable assuming constant material properties. In the case of a point heat source moving in the x-direction impinging on a semi-infinite solid, the temperature field is given by the expression shown below. This is within the reference frame of the beam.

$$T - T_0 = \frac{P}{2\pi k R} \exp\left\{-\frac{V(R-x)}{2\alpha}\right\} \qquad \text{Eq. (3)}$$

Where R is the distance to the heat source, P is the beam power, V is the travel speed in the x-direction, k is the thermal conductivity, $T_0$ is the ambient temperature of the powder bed, and $\alpha$ is the thermal diffusivity.

Now if the reference frame is changed to assume that the measurement is being made in the material as the beam is moving past the measurement point, then the approximate relationship describing the time history of the thermal profile is described by:

$$T - T_0 = \frac{P}{2\pi k V t} \cdot \exp\left\{-\frac{r^2}{4\alpha t}\right\} \qquad \text{Eq. (4)}$$

Where r is now the distance to the centerline of the melt pass, P is the beam power, V is the travel speed in the x-direction, k is the thermal conductivity, $T_0$ is the ambient temperature of the powder bed and $\alpha$ is the thermal diffusivity. If we differentiate Eq. (4) and set the derivative equal to zero, an expression for the maximum temperature can be derived:

$$T_{MAX} - T_0 = \frac{2\alpha P}{\pi e k V r^2} \qquad \text{Eq. (5)}$$

Where r is the distance to the centerline of the melt pass, P is the beam power, V is the travel speed in the x-direction, k is the thermal conductivity, $T_0$ is the ambient temperature of the powder bed and $\alpha$ is the thermal diffusivity.

Alternatively, if we differentiate Eq. (3) with respect to time and only consider points along the melt centerline, i.e. r=0, then after rearranging the terms by applying Eq. (4) again to replace time as a variable, we get:

$$\frac{\partial T}{\partial t} = -\frac{2\pi k V}{P} \cdot (T - T_0)^2 \qquad \text{Eq. (6)}$$

Now it is instructive to consider a few characteristic times for the Additive Manufacturing process especially when conducted by a moving intense heat source. The characteristic beam interaction time is the timescale over which the moving heat source or beam interacts with any given region of material, and it is given by:

$$\tau_{BEAM} = \frac{D}{V} \qquad \text{Eq. (7)}$$

Where D is the beam diameter and V is the travel speed of the beam. The characteristic heat conduction time is the time for heat to conduct away from the molten region.

Typically in Additive Manufacturing involving powder beds, the thickness of the layer being deposited is less than the beam diameter, and is also less than the melt pool diameter. However the beam melts more than just the layer being deposited, and metallurgical evidence indicates that the melt pool has roughly a 1 to 1 aspect ratio in terms of width to depth. Therefore the characteristic distance over which heat conduction should be evaluated is roughly the beam diameter as well. In this case, the characteristic heat conduction time is then given by:

$$\tau_{COND} = \frac{D^2}{4\alpha} \qquad \text{Eq. (8)}$$

Where D is the beam diameter and $\alpha$ is the thermal diffusivity. It should be noted that in some cases the heat source can have other shapes and the use of a circular beam geometry for a heat source should not be construed as limiting. For many cases of practical interest, the beam diameter is on the order of 100 microns, the travel speed is on the order of 1 m/s, and the thermal diffusivity is on the order of $1\text{-}5\times 10^{-6}$ m$^2$/s. For alloys like aluminum alloys this will be higher possibly by an order of magnitude, but for steels, titanium alloys, and nickel alloys the thermal diffusivity is lower. Under these conditions, the characteristic beam interaction time $10^{-4}$ sec., and the characteristic heat conduction time is 5 to 10 times as long. Therefore there will be superheat in the liquid as well as a thermal gradient between the center and the edge of the melt pool. These conditions will drive what is known as a Marangoni flow, or a flow which is driven by surface tension gradients as the surface tension strongly depends on the temperature, and in the case of such small melt pools the surface tension will dominate any inertial forces.

However there are several factors which will counteract the tendency for the pool to overheat or to maintain very large thermal gradients. Firstly, any overheating will drive evaporation, and given that the latent heat of evaporation of is very large for most metals, this will have a powerful cooling effect. For example in a 100 micron diameter melt pool in steel, evaporation of just 1% of the mass of the melt pool will cool the pool by more than 5%. Therefore evaporation will be a powerful mechanism by which overheating is avoided in practice. Additionally, the Marangoni flows will serve to lessen thermal gradients through convection, although if thermal gradients disappear entirely then the Marangoni flow itself stops. Lastly from a practical measurement perspective, it is difficult to get a non-imaging thermal sensor which will have a spot size less than 100 microns and still have a large standoff distance to enable a remote measurement. The net result of all of these physical phenomena as well as measurement limitations is that the following relationship exists between the observed temperature in a Lagrangian (beam-following) reference frame and the actual peak temperature of the melt pool which will hold roughly over the diameter of the melt pool:

$$T_{OBS} = K \cdot T_{MAX} \qquad \text{Eq. (9)}$$

Or alternatively:

$$T_{MAX} = K' \cdot T_{OBS} \qquad \text{Eq. (10)}$$

Where $T_{MAX}$ is the peak temperature, $T_{OBS}$ is the observed temperature as seen by a non-contact sensor in the frame of reference of the beam (Lagrangian frame), and K or K' are constants that depend on emissivity, the field of view of the temperature sensor, and other optical properties of the measurement that could cause attenuation and losses such as lenses, mirrors, etc.

Now let T* be defined as:

$$T^* \equiv (T-T_0) \qquad \text{Eq. (11)}$$

Then:

$$T_{MAX}^* = (T_{MAX} - T_0) \qquad \text{Eq. (12)}$$

Then by invoking Eq. 10, this becomes:

$$T_{MAX}^* = (K' \cdot T_{OBS} - T_0) \qquad \text{Eq. (13)}$$

And by further invoking Eq. 4 this becomes:

$$T_{MAX}^* = (K' \cdot T_{OBS} - T_0) = \frac{2\alpha P}{\pi e k V r^2} \qquad \text{Eq. (14)}$$

And since this holds over roughly the region of the meltpool, we can substituted d/2 for r, where d is the melt pool diameter:

$$T_{MAX}^* = (K' \cdot T_{OBS} - T_0) = \frac{8\alpha P}{\pi e k V d^2} \qquad \text{Eq. (15)}$$

Now with respect to the cooling rate, it is possible to combine Eq. 13 and Eq. 6 to estimate the cooling rate associated with the melt pool along the centerline (r=0) and at the trailing edge of the melt pool, i.e. the liquid/solid boundary that trails with respect to the motion of the heat source:

$$\frac{\partial T}{\partial t} = -\frac{2\pi k V}{P} \cdot (K' \cdot T_{OBS} - T_0)^2 = -\frac{2\pi k V}{P} \cdot (T_{MAX}^*)^2 \qquad \text{Eq. (16)}$$

So Eq. (15) and Eq. (16) allow measurements of peak temperature from a non-imaging sensor in the Lagrangian frame of reference to be combined with known values of power and travel speed to be used to calculate cooling rate as well as melt pool size, for example. This is just one example of such a models-based inference that combines real process measurements with models to predict and infer quantities that are otherwise difficult to measure in the Lagrangian frame of reference. Other examples of models could include: finite element models, finite difference models, lookup tables based on either empirical data or compiled results of analytical models, neural networks, expert systems, databases, or any other parametric or heuristic methodology which allows correlations to be made between variables and inferences to be made about quantities not directly experimentally observed.

Figure 2:
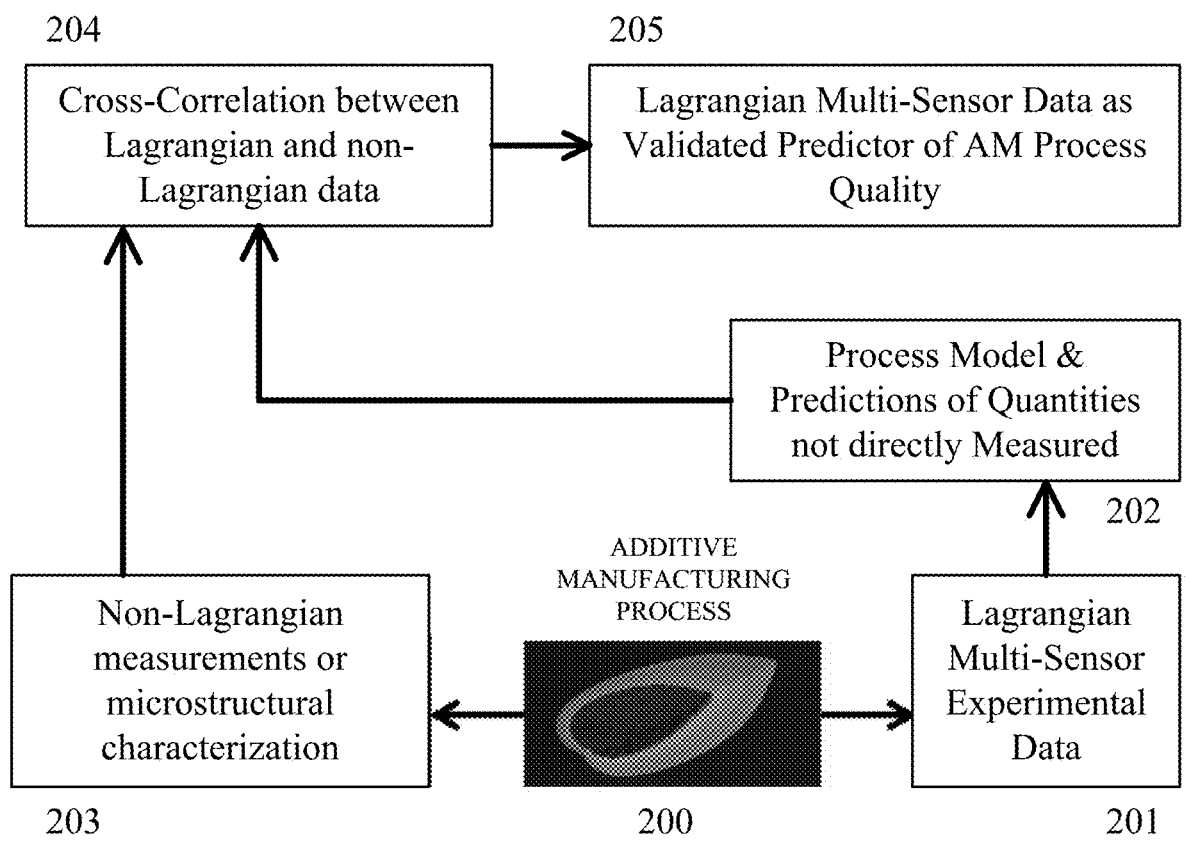
FIG. 2 is an illustration of a detailed way in which multi-sensor Lagrangian data can be combined with models to predict process parameters in an Additive Manufacturing process that are not directly experimentally measured.

FIG. 2 is an illustration of a detailed way in which multi-sensor Lagrangian data can be combined with models to predict process parameters in an Additive Manufacturing process that are not directly experimentally measured. The Additive Manufacturing process 200 is sensed by a variety of sensors 201 in the Lagrangian frame of reference. Based on this experimental data and with the aid of process models as previously described above, the real-time multi-sensor Lagrangian data is used to predict quantities or parameters 202 which are not possible to directly measure in the Lagrangian frame of reference, such as the cooling rate as indicated above. In parallel, non-Lagrangian data 203 such as Eulerian thermal measurements, or metallurgical data such as melt pool size measurement directly from metallurgical cross sections, are collected. This non-Lagrangian data 203 is used for the purposes of validating the Multi-sensor Lagrangian data 201. A cross-correlation 204 is performed using a variety of statistical or non-statistical methods. The purpose of this cross-correlation 204 is to validate the ability of the Lagrangian multi-sensor data 201 in conjunction with the model predictions 202 to accurately predict process parameters not directly measured within the Lagrangian reference frame. Once this cross-correlation 204 is successfully demonstrated, then the Lagrangian data 201 alone becomes an accurate predictor of process quality 205. This is a beneficial characteristic of some embodiments of the present invention.

One specific method by which the cross-correlation 204 can be achieved is now discussed. First, the features associated with a baseline condition are identified as one set of Lagrangian data 201. Then the features from any given test case are compared to the baseline condition as follows. First the features from the baseline case are averaged and a vector of the mean of these features M is created. The test vector X has the same dimensionality as the vector of feature means because it has the same number of features, which will be also called the degrees of freedom. Then the classification scheme taught in this present invention involves the use of the Mahalanobis distance, which is simply given by:

$$MD^2 = [\overline{X} - \overline{M}]^T \cdot COV_x \cdot [\overline{X} - \overline{M}] \qquad \text{Eq. (17)}$$

Where $COV_x$ is the covariance matrix of X. It can be shown that when the features are normally distributed, then the square of the MD distance will be Chi-Square distributed. The Chi-Squared probability density distribution is given by:

$$f(x; k) = \begin{cases} \dfrac{x^{(k/2)-1} e^{-x/2}}{2^{k/2} \Gamma\left(\dfrac{k}{2}\right)}, & x \geq 0; \\ 0, & \text{otherwise.} \end{cases} \qquad \text{Eq. (18)}$$

Where $\Gamma$ is the Gamma Function and k is the number of degrees of freedom, which in this case is identical to the number of features. The critical value of the Chi-Squared distribution at a given confidence level and a given number of degrees of freedom can be calculated. This is a threshold value of the distribution above which a point could be considered as an outlier within the context of fitting the MD Distance t a Chi-Squared distribution. For example, at a 95% confidence level, or a critical p-value of 0.05, the corresponding table of critical values of the Chi-Squared distribution and therefore the MD distance squared as well are given by the following table:

TABLE 1

CRITICAL VALUES OF CHI-SQUARED DISTRIBUTION

| Degrees of Freedom (also the number of Features in the Feature Vector) | Critical Value of the Chi-Squared Distribution - also critical value of the square of the MD distance |
| --- | --- |
| 1 | 3.84 |
| 2 | 5.99 |
| 3 | 7.82 |
| 4 | 9.49 |
| 5 | 11.07 |
| 6 | 12.59 |

TABLE 1-continued

CRITICAL VALUES OF CHI-SQUARED DISTRIBUTION

| Degrees of Freedom (also the number of Features in the Feature Vector) | Critical Value of the Chi-Squared Distribution - also critical value of the square of the MD distance |
|---|---|
| 7 | 14.07 |
| 8 | 15.51 |
| 9 | 16.92 |
| 10 | 18.31 |

Multi-Sensor Lagrangian Data Collection

Figure 3A:
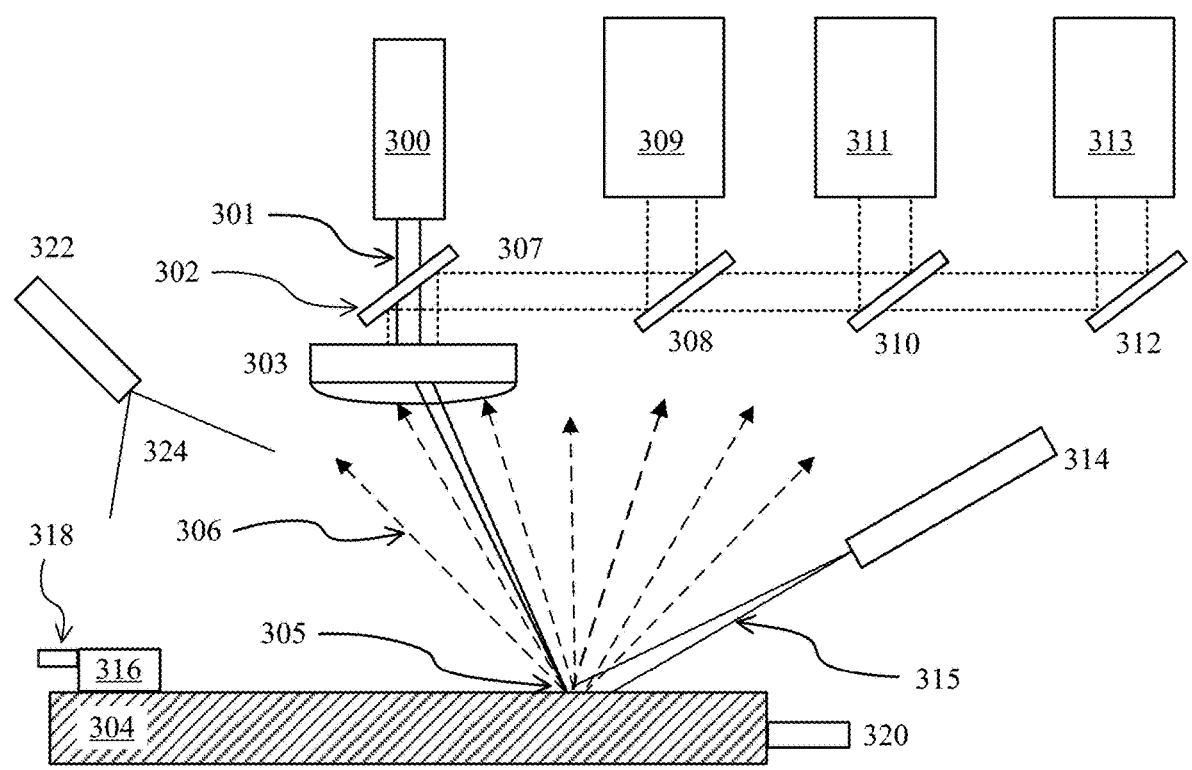
FIG. 3A is a schematic illustration of a system with an intense heat source, in this specific instance taken to be a laser beam.
Figure 3B:
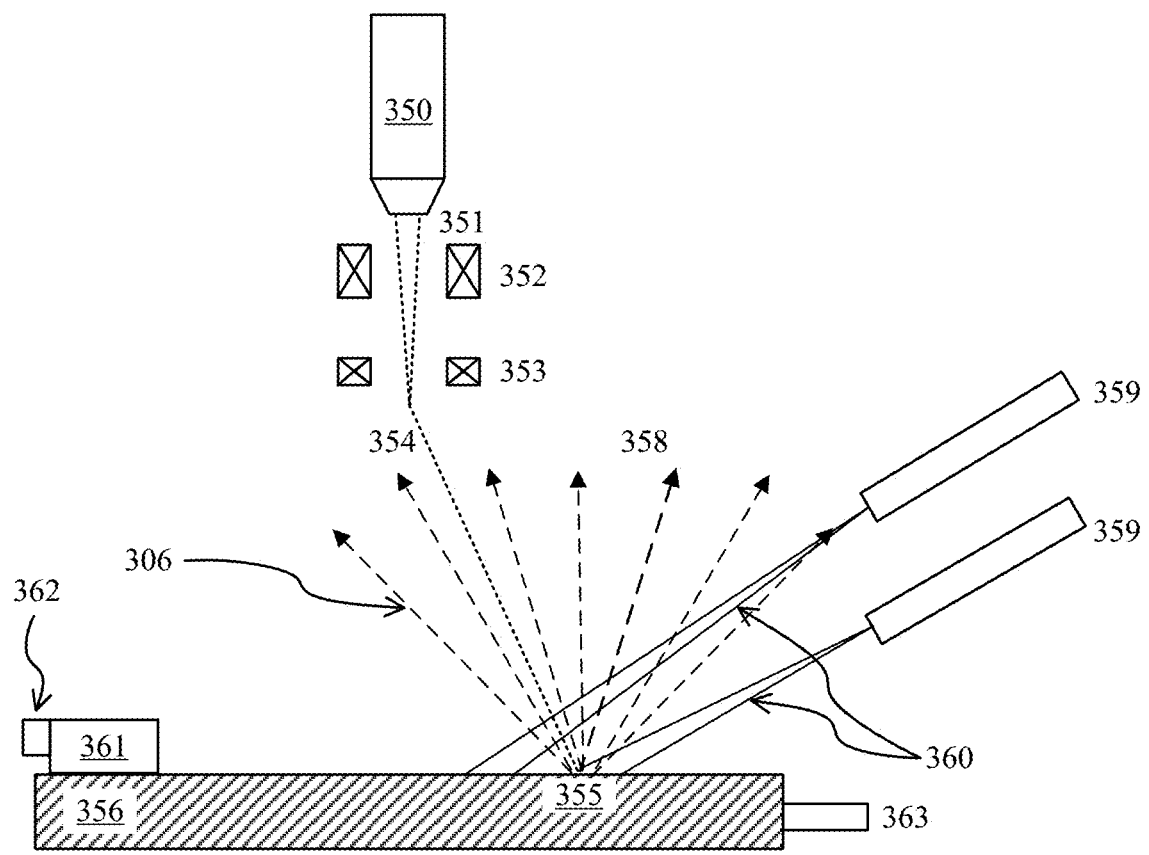
FIG. 3B is a schematic illustration of a system with an intense heat source, in this specific instance taken to be an electron beam.

FIGS. 3A-3B show various configurations of a multi-sensor Lagrangian process sensing scheme. It is instructive to examine precisely in what manner the Lagrangian data can be acquired so that in combination with models and a cross-correlation technique as described above, the Lagrangian data can become predictive of process features and attributes that would otherwise only be observable in a Eulerian reference frame. In FIG. 3, the intense heat source 300 is in this specific instance taken to be a laser. The beam 301 emitted by heat source 300 originates at the laser head and passes through a partially reflective optic 302. This optic 302 is designed to be essentially fully transmissive at the specific wavelength that the laser operates, and reflective at other optical wavelengths. Generally the laser wavelength will be infrared or near-infrared, or typically wavelengths of 1000 nm or greater. The laser can include a scanning head 303 that consists of x and y positioning galvanometers as well as a focus lens, such as an f-theta lens. The beam 301 is therefore focused and strikes the workpiece 304 at a given location 305 thus generating a molten region on the workpiece 304. The heated region results in optical radiation 306 being emitted isotropically and uniformly over a large solid angle. Some of this optical radiation 306 will make its way back through the scanning head 303 and is reflected by the partially reflective optic 302.

This reflected optical beam 307 then makes its way through a series of analytical instruments. A beam splitter 308 sends a portion of the beam to a photodiode 309. Photodiode 309 can be capable of sensing a range of frequencies at a high enough speed and recording rate to detect possible anomalies occurring during a deposition process, i.e. sudden departures from an average or mean intensity level. The remaining portion of the reflected optical beam 307 then goes to another beam splitter 310 and a portion of this beam is collected by a pyrometer 311. The pyrometer 311 may integrate this signal over some time interval in order to assign a temperature to the light thus collected. The signal should be corrected for the various optical attenuations that have occurred through beam splitting as well as the correction for the remote location of the molten region 305 on the workpiece 304 that resulted in the optical emission 306 of which a portion 307 was collected. Lastly the remaining portion of the reflected optical beam 307 is directed by a mirror 312 into a high speed optical imaging sensor 313 which could be a camera, or some other kind of linear or area CCD array or other imaging array. This optical imaging sensor 313 captures a 1D or 2D image that correlates to the size of the molten region. By using a relatively low resolution sensor 313, sensor 313 can be configured to record data at extremely high frame rates, so that sensor 313 is capable of detecting very transient temperature excursions occurring during a build process.

In addition to the various sensors in the Lagrangian reference frame, a critical part of this present invention is the existence of at least one or some small set of measurements made in an Eulerian reference frame that is completely independent of the Lagrangian reference frame. This Eulerian measurement is used for correlation and calibration purposes. For example in FIG. 3, a stationary pyrometer 314 in the Eulerian reference frame independently measures the temperature and therefore provides a calibration to the measurement made by the Lagrangian pyrometer 311. The field of view 315 of the stationary Eulerian pyrometer 314 is suitably chosen so that it matches the characteristic dimension of the molten zone 305 existing on the workpiece 304 and made by the focused laser beam 301 at the specific location to which the scanning head 303 displaced and focused the beam 301.

In addition to the aforementioned sensors, additional sensors can be added to enhance measurements taken by the additive manufacturing sensor system. Device 316 can be a part of a mechanism that distributes layers of powder across a top surface of workpiece 304. Device 316 can include a contact sensor 318 that is configured to measure any disruptions to the spreading of the powder such as vibrations or jolts likely to result in an uneven application of the powder. In some embodiments, sensing of a vibration of device 316 can be used to accurately predict changes to the powder layer. The depicted sensing system can also include an acoustic sensor 320. Acoustic sensor 320 can be arranged along one side of the build platform so that as workpiece 304 is built up acoustic sensor 320 can be configured to listen for the formation of micro-cracks within workpiece 304. Acoustic sensor 320 can be calibrated to determine various characteristics of micro-cracking within workpiece 304. Micro-cracking can be caused from many things but in particular from improper cooling rates. FIG. 3A also shows a Eulerian photodiode 322 having a field of view 324, which can be configured to detect temperature changes in substantially any portion of the top surface of workpiece 304. In some embodiments, pyrometer 314 can be configured to provide calibration information to Eulerian photodiode 322, thereby allowing Eulerian photodiode 322 to accurately distinguish the temperature of any point on the top surface of workpiece 304.

FIG. 3B shows an alternative embodiment in which an electron beam is utilized to melt materials as part of an additive manufacturing process. In particular, FIG. 3B shows electron beam system including electron beam gun 350, which generates an electron beam 351 that is focused by the electromagnetic focusing system 352 and is then defected by the electromagnetic deflection system 353 resulting in a finely focused and deflected electron beam 354, which creates a hot beam-material interaction zone 355 on the workpiece 356. Optical energy is emitted 358 which could be collected by a series of sensors 359 each with their own respective field of view 360 which again could be locally isolated to the interaction region 355 or could encompass the entire build area 356. Additionally, the sensors 359 could have their own optical tracking and scanning system which could follow the electron beam 354 as it moves across the build area 356. Whether or not these sensors 359 have optical tracking or not, the sensors 359 could consist of pyrometers, photodiodes, spectrometers, and high or low speed cameras operating in the visible or infrared (IR) spectral regions. The sensors 359 could also be sensors which combine a series of physical measurement modalities such as a laser ultrasonic sensor which could actively excite or "ping" the deposit with one laser beam and then use a laser interferometer to measure the resultant ultrasonic waves or "ringing" of the structure in order to measure or predict mechanical properties or mechanical integrity of the deposit as it is being built. Additionally, there could be contact sensors 362 on the mechanical device 361, which spreads the powders. Contact sensors 362 could be accelerometers, vibration sensors, etc. Lastly there could be other types of sensors 363. These could include contact sensors such as thermocouples to measure macro thermal fields or could include acoustic emission sensors which could detect cracking and other metallurgical phenomena occurring in the deposit as it is being built. In some embodiments, one or more thermocouples could be used to calibrate temperature data gathered by sensors 359. It should be noted that the sensors described in conjunction with FIGS. 3A and 3B can be used in the described ways to characterize performance of any additive manufacturing process involving sequential material build up.

Figure 4:
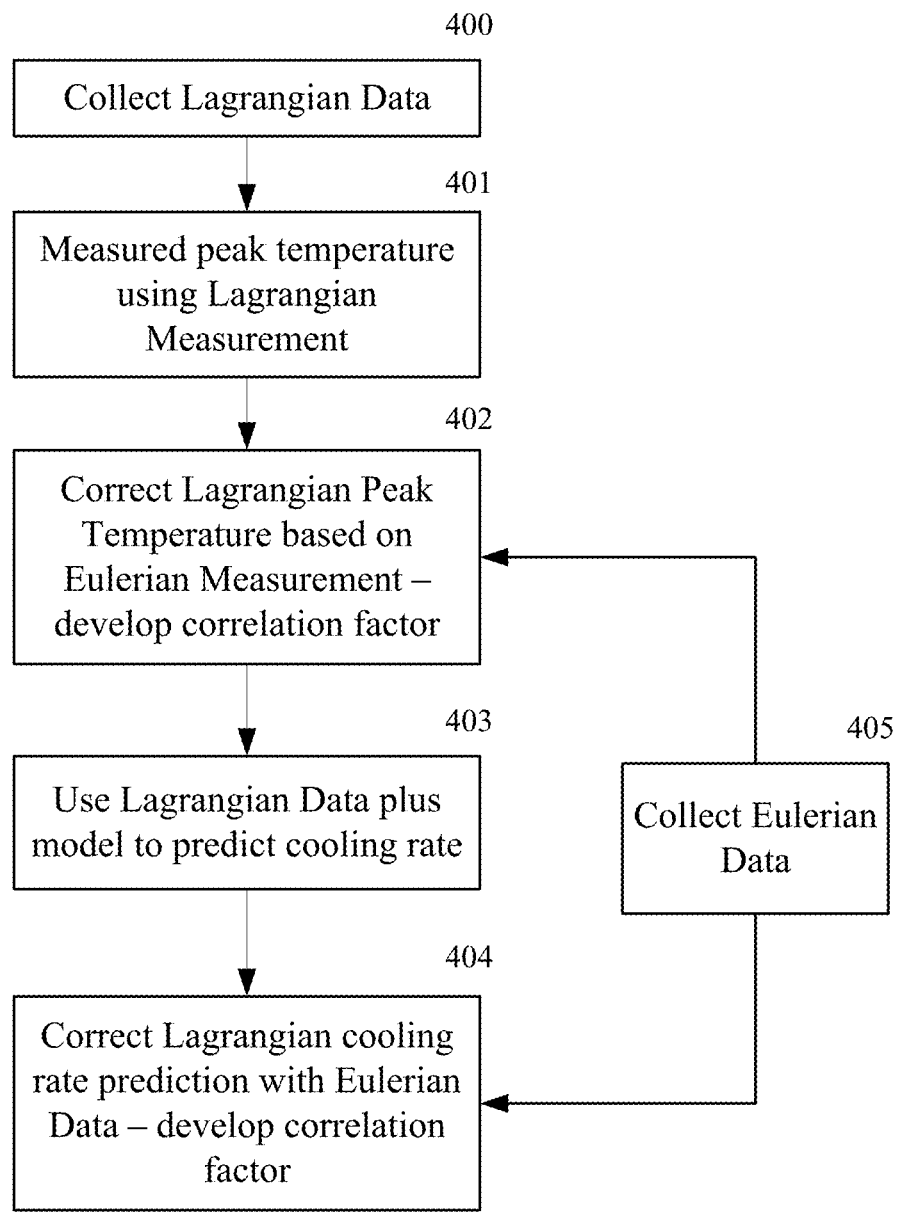
FIG. 4 is an illustration of a more specific correlation protocol by which the various measurements made in different frames of reference can be cross-correlated.

FIG. 4 shows a correlation protocol by which various measurements made in different frames of reference can be cross-correlated is shown in FIG. 4. The Lagrangian data 400 is collected in the manner as described previously. The measured peak temperature 401 in the Lagrangian reference frame is recorded at any given instance in time. The Lagrangian peak temperature 401 can be corrected by a correlation factor 402 which is derived by comparing the Lagrangian data to the Eulerian data 405 over the given time step and making corrections as required. By doing this at multiple locations in the build plane, the correlation factors 402 may be experimentally derived. The need for such a correlation factor arises principally for two reasons. First, there are a multitude of optical attenuations as the collected light radiated from the molten zone makes its way back through the optical train of the Lagrangian sensors. This was described in detail in FIG. 3. Additionally, there is an error associated with the view factor from the molten zone back to the scanning head where both the laser light is projected onto the build plane as well as the radiated light from the molten zone is collected. This view factor varies as the molten zone moves around on the build platform. Therefore if a variety of calibration points are chosen on the build plane where the Eulerian sensor could be trained as well as the Lagrangian sensors could collect data, in this manner a correlation and correction factor matrix 402 could be derived.

Then in the next step of the correlation protocol the corrected peak temperature in the Lagrangian frame 402 is combined with the various models as described previously to make a prediction of the cooling rate surrounding the molten region and essentially at any point in the build plane. However, there will inevitably be modeling errors which will distort this prediction. For example, in order to get a model that can run in real time, reduced order physics can be used. The use of such models will inevitably result in a loss of fidelity as the runtime speed is traded off for model complexity. Therefore, another set of correlation parameters 404 is needed to correct errors in the predicted cooling rate based purely on Lagrangian data. This is most effectively done by again invoking the Eulerian data 405 and comparing it to the predictions 403 made by the Lagrangian data.

Therefore in this manner, FIG. 4 describes a complete protocol for correcting a variety of errors in the Lagrangian data by invoking Eulerian data collected over the same regions of space in the build plane and during the same time interval. By changing the locations at which this correlation is made, a representative set of correlation factors (or even matrices of such correlation factors) and be derived as indicated by 402 and 404 in FIG. 4.

It is instructive to now consider the specific kinds of inferences and process conditions which may be tracked by the use of various Lagrangian sensors as well as their correlation to corresponding Eulerian sensors. First, consider the Photodiode sensor, hereinafter abbreviated as PD. The photodiode sensor in the Lagrangian frame of reference measures the integrated effect of the radiated optical energy coming from the molten zone and collected by the scanning optical system. The various physical factors that will influence the magnitude of the photodiode (PD) signal include: size of the molten region; temperature of the view factor; emissivity of the molten region; geometrical view factor between the view factor and the scanning head optics; various optical attenuations throughout the optical train in order to reach the PD sensor; and the spectral response of the PD sensor.

Despite all of these physical factors which should be properly accounted for to interpret the PD signal in an absolute sense, it can nevertheless provide valuable relative information and could form the basis for discerning various process conditions.

As an example, consider variations in power as well as travel speed. For example consider the following parametric variations in power and travel speed for a specific laser powder sintering process.

TABLE 2

Example of Process Variations in Beam Power and Travel Speed

| Beam Power, W | Travel Speed, mm/s |
|---|---|
| 97.5 | 400 |
| 97.5 | 800 |
| 146.4 | 400 |
| 146.4 | 600 |
| 146.4 | 1000 |
| 146.4 | 1200 |
| 195 | 400 |
| 195 | 800 |
| 195 | 1600 |

Figure 5:
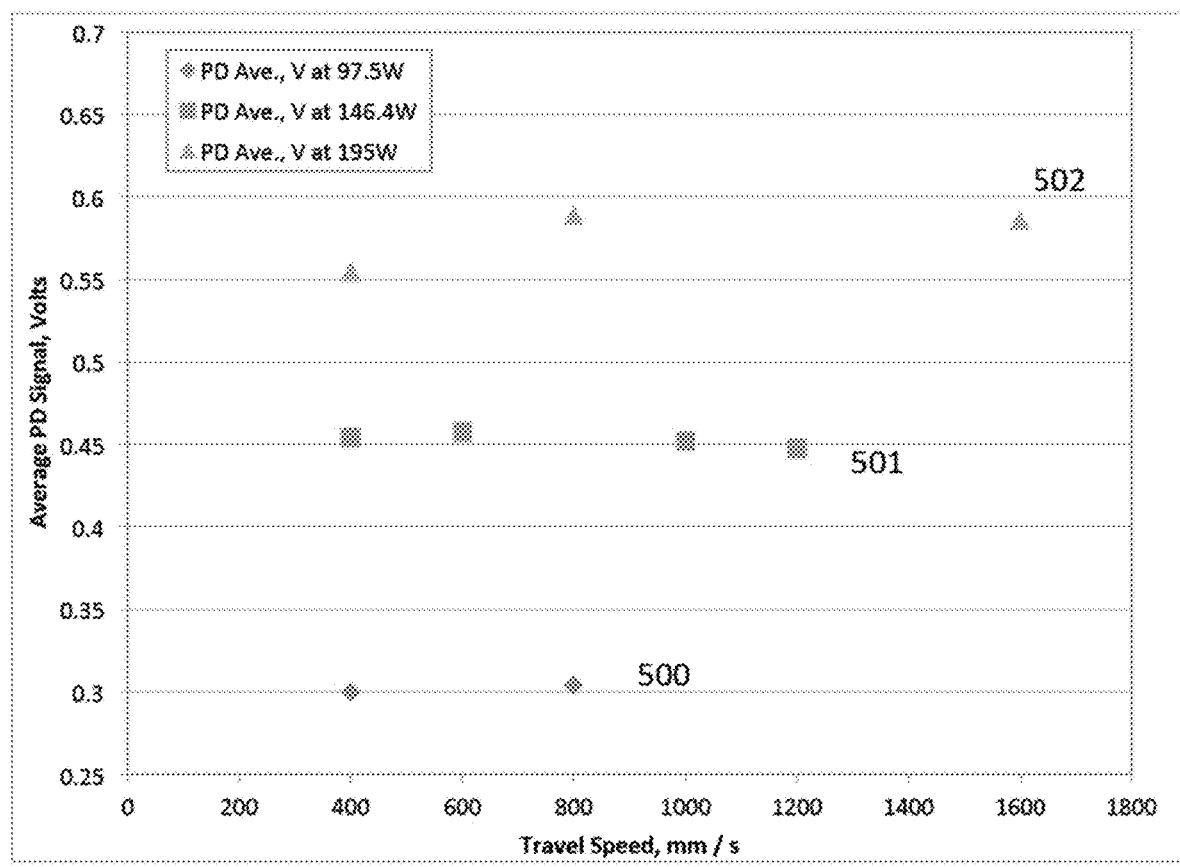
FIG. 5 shows the resulting average photodiode signal intensity in a Lagrangian reference frame for the process conditions shown in Table 1.
Figure 6:
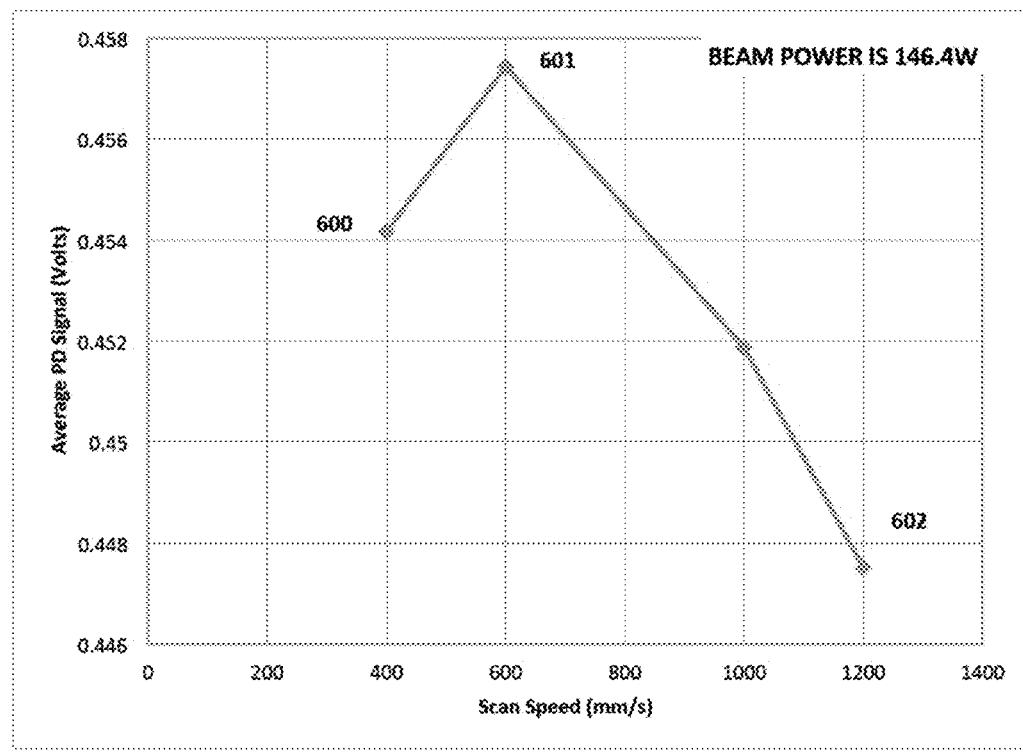
FIG. 6 shows the variation in photodiode Average Voltage signal with travel speed at the power level of 146.4 W.

FIG. 5 shows the resulting average PD signal intensity in the Lagrangian reference frame for the process conditions shown in Table 2. It is seen that the PD signals for 97.5 W beam power 500, 146.4 W beam power 501, and 195 W beam power 502 are all readily distinguishable on the basis of the PD signal intensity. If the individual power levels are examined and the variation with travel speed is more closely studies, then a consistent trend is discovered. For example FIG. 6 shows the variation in PD Average Voltage signal with travel speed at the power level of 146.4 W. At low travel speeds of 400 mm/s, the PD signal is lower than at slightly higher travel speeds. It should be noted that the laser sintering process is occurring in a powder bed, and that at lower travel speeds, and it is important to consider various characteristic times associated with powder consolidation as they compare to the characteristic time of interaction which will go down as the travel speed goes up. First it should be determined if the powder consolidation mechanism is dominated by either capillary forces or inertial forces.

First, the Capillary time is the time necessary for an interface to regain its equilibrium shape after a perturbation and is given by:

$$t_{CAP} = \frac{\eta L}{\sigma} \qquad \text{Eq. (19)}$$

Where $\eta$ is the viscosity, L is the characteristic length, and $\sigma$ is the surface tension. Similarly the Rayleigh time is defined as the time required for the relation of the interface under the action of inertia and surface tension forces:

$$t_{RAY} = \sqrt{\frac{\rho L^3}{\sigma}} \qquad \text{Eq. (20)}$$

Where ρ is the density, L is the characteristic length, and σ is the surface tension. Typical values for various thermophysical constants for the titanium alloy Ti-6A1-4V are given in the table below.

TABLE 3

Thermophysical Properties for Ti—6Al—4V from the Reference by Koerner, Bauereiss and Attar)

| Physical properties | Experiment |
| --- | --- |
| Density (liquid) | 4000 kg m$^{-3}$ |
| Viscosity | 0.005 Pas |
| Surface tension | 1.65 N m$^{-1}$ |
| Gravitational acceleration | 9.81 ms$^{-2}$ |
| Thermal diffusivity of solid | 7.83 × 10$^{-6}$ m$^2$ s$^{-1}$ |
| Thermal diffusivity of liquid | 9.93 × 10$^{-6}$ m$^2$ s$^{-1}$ |
| Solidus temperature | 1878 K |
| Liquidus temperature | 1928 K |
| Preheat temperature | 1023 K |
| Latent heat | 0.37 × 10$^6$ J kg$^{-1}$ |
| $\lambda_{obs}$ | 0.4 μm$^{-1}$ |
| Specific heat | 700 J kg$^{-1}$ K$^{-1}$ |

Using these properties and a characteristic length of 100 microns, we get the following approximate values for the Capillary and Rayleigh times:

$$t_{CAP} = 10^{-7} / t_{RAY} = 10^{-4} \qquad \text{Eq. (21)}$$

The characteristic beam interaction time for various travel speeds is shown in the table below.

TABLE 4

Characteristic Beam Interaction Time as a Function of Travel Speed

| Travel Speed, mm/s | Beam Interaction Time for 100micron length, seconds |
| --- | --- |
| 400 | 2.5E−04 |
| 600 | 1.7E−04 |
| 800 | 1.3E−04 |
| 1000 | 1.0E−04 |
| 1200 | 8.3E−05 |
| 1600 | 6.3E−05 |

Considering Equation 21 and Table 4, it is apparent that the Capillary time is much shorter than the Rayleigh time, so the powder consolidation process after melting is dominated inertial effects countered by surface tension as opposed to viscous effects. Secondly, the beam interaction time for low values of travel speed are of the same order of magnitude as the Rayleigh time. This accounts for the lower PD emission at lower travel speeds as the molten particles are rearranging themselves on the same time scale as the melting process is occurring, and therefore the surface of the molten region will not be regular or smooth as this process is occurring. From Eq. 8, we find that the characteristic time for heat conduction is an order of magnitude larger than the Rayleigh time. Therefore hydrodynamic phenomena are not limiting the consolidation of powders after melting, but rather thermal conductivity is the "bottleneck" process.

Figure 7:
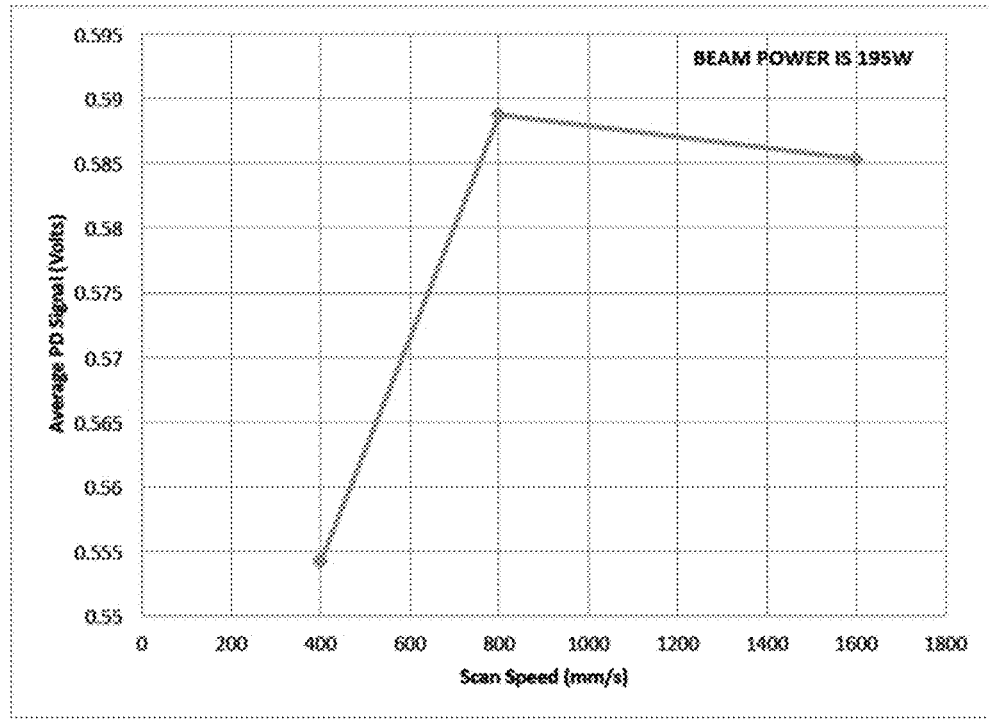
FIG. 7 shows a similar trend as FIG. 6 at 195W.

At higher travel speeds, the beam interaction time now becomes shorter than the Rayleigh time and much shorter than the heat conduction time. Therefore the energy density per unit length along the path of the laser as expressed in J/mm drops. As this drops, the average temperature of the melt pool will cool, and therefore the PD signal will drop with increasing travel speed once the characteristic beam interaction time has become smaller than the Rayleigh time. This trend holds true at higher power levels too, and FIG. 7 shows a similar trend at 195W.

Figure 8:
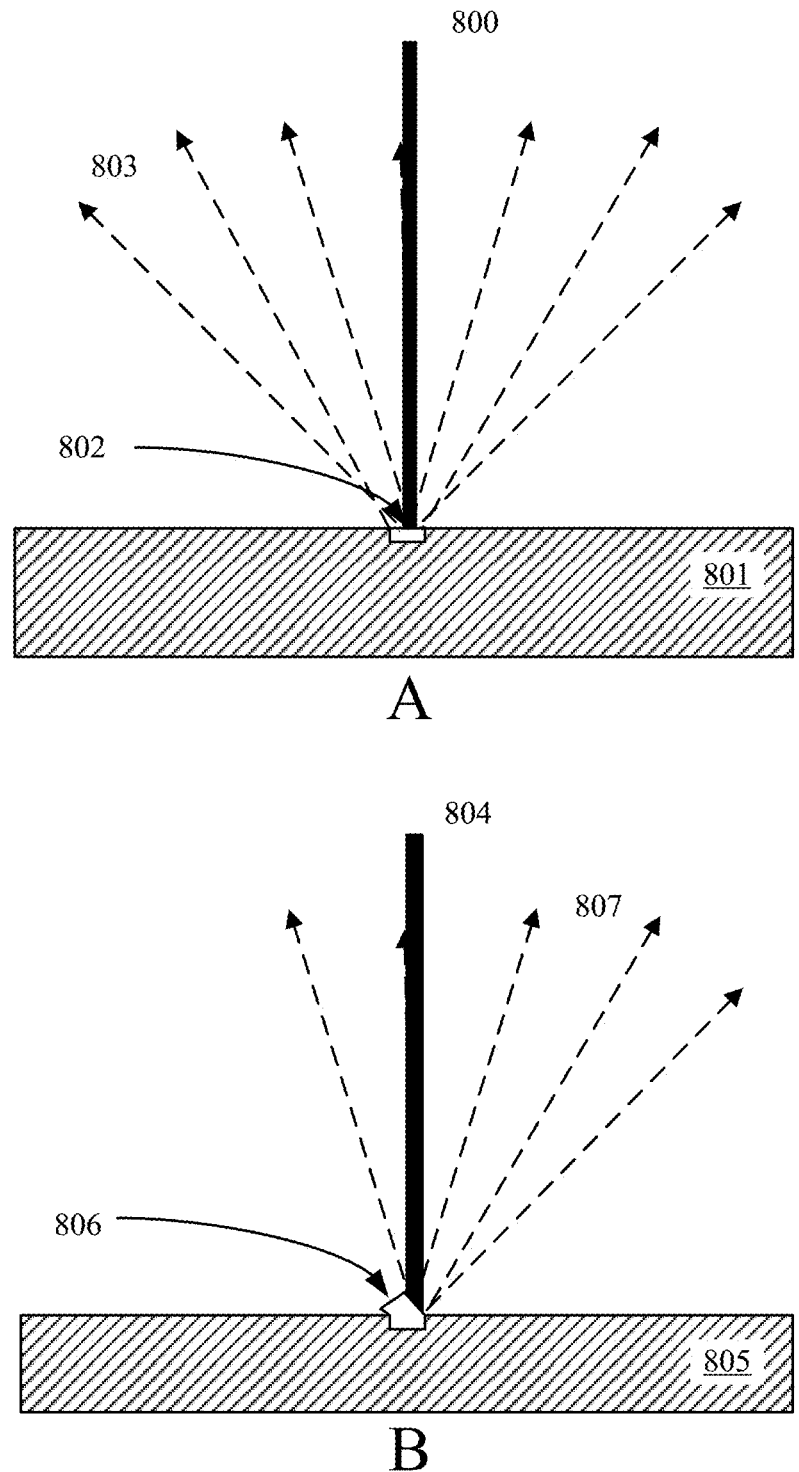
FIG. 8 shows both nominal and off nominal conditions during additive manufacturing operations.

FIG. 8 shows exemplary embodiments in which the photodiode, or PD signal, could also be used for anomaly detection. For example, consider the situation of a laser powder bed melting process utilizing a laser as the intense moving heat source. If there occurs a localized anomaly in the powder bed such that it momentarily disrupts the PD signal and causes it to fluctuate, this will result in a signal characteristic that may be discernable either in a temporal analysis or a frequency based analysis. The physical basis for this fluctuation is that the light emission characteristics of the source will momentarily change and will cause a disruption to the PD signal. In FIG. 8, both nominal conditions and off-nominal conditions are shown in A and B respectively. In A, the laser beam 800 strikes the substrate 801 and produces a melt pool 802. If the surface conditions have no irregularities, then the emitted light 803 is radiated in a solid angle equal to 2π steradians, or the entire top plane in a uniform manner. In B, there is depicted the hypothetical occurrence of a very large powder particle that is in the powder bed and that significantly skews the melt pool as well as the local geometry. In this case the beam 804 strikes the substrate 805 as before, but the melt pool 806 is significantly distorted due to the local geometric anomaly. Therefore the light emitted 807 does not radiate uniformly over the 2π steradians as before, but rather the radiation distribution is now less uniform and has asymmetrical properties. This will directly impact the observed PD signal as the PD signal is nothing more than the collected light radiated from the melt pool and collected through the scanning head optics. Any change in the spatial or temporal distributions of this radiation will directly impact the PD signal and will therefore result in an anomaly event that could be detected in the time domain, the frequency domain, or a combination of both.

Shifting attention to the use of imaging sensors, it is useful to consider what information may be obtained from such sensors. By imaging sensor in this current work is meant any multi-pixel array of optical elements capable of detecting light over a range of frequencies. Furthermore an image shall mean any light pattern that is projected on such a sensor array through a series of optics such as lenses, mirrors, gratings, etc. it is important to note that the sensor array will provide both imaging and non-imaging information.

Figure 9:
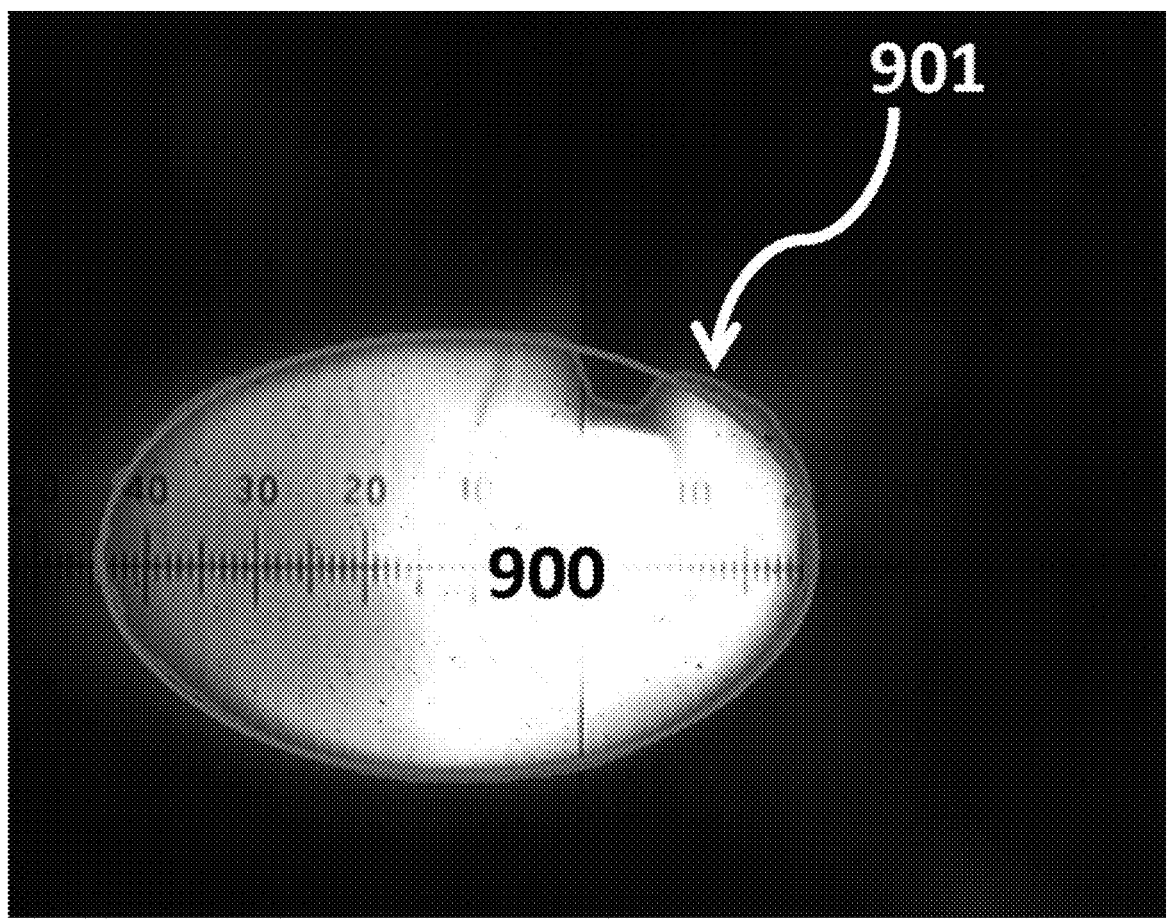
FIG. 9 shows a melt pool.

FIG. 9 shows melt pool 900 clearly visible in this single frame from a high speed camera that was observing an electron beam melting additive manufacturing process. Using image processing software, it is possible to quickly find the outline of the melt pool 901 and therefore to quantify the size of the melt pool. However this is only a top surface view and does not always correlate to the depth or volume of the melt pool. Using the same high speed images as shown in FIG. 9, it is possible to extract non-imaging information from these images. In FIG. 10, the same image as shown in FIG. 9 is shown in false color highlighting. The melt pool 1000 is again shown as an image that can be measured. However, if discretize the entire image and look at the light intensity within these discrete elements, it is possible to extract non-imaging information from such data. For example, 1001 is an element at the edge of the melt pool at one location, and 1002 is another such element at another location. If these areas 1001 and 1002 are considered to be virtual sensors, it is possible to see the intensity level at these locations and to plot this data as a function of time. Therefore 1003 is the time trace corresponding to the intensity data collected at region 1001, and correspondingly 1004 is the time trace of intensity data from location 1002.

Figure 11:
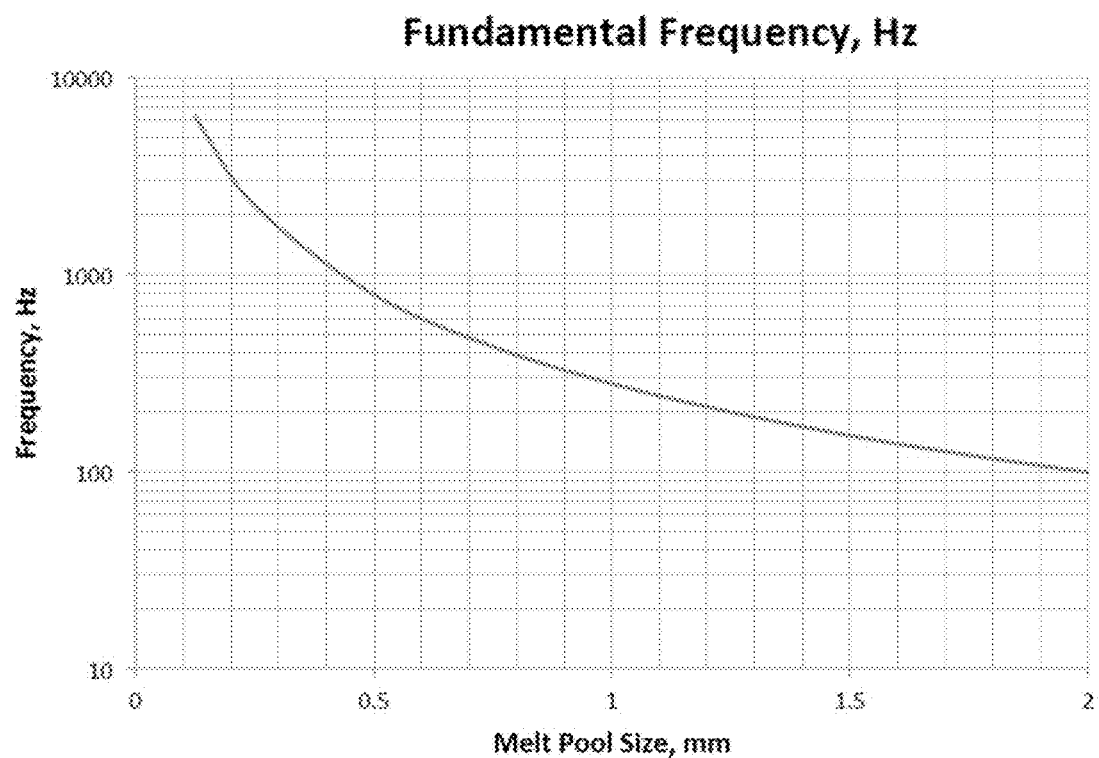
FIG. 11 shows the dependence of oscillation frequency as a function of melt pool size for the primary or first mode of oscillation.

It is clear from the plots in FIG. 10 that the light intensity collected from different regions of the melt pool image are periodic and exhibit an oscillatory behavior. The direct physical explanation of this oscillatory behavior is that the melt pool may be considered as a droplet of liquid that has various forces acting on it including inertial forces as well as surface tension forces. Under the restoring force of surface tension, any disturbance to the liquid droplet will result in oscillations and modes of oscillation. The free surface of the melt pool should therefore be in motion due to these oscillations, and any emitted or reflected light would therefore be modulated by these oscillations. Therefore the signals as measured in FIG. 10 and reflected in the time traces 1003 and 1004 should contain frequency information on the melt pool. Additionally, artificial illumination such as that from a laser at a different frequency could be used to accentuate these specular reflections from the melt pool that could contain frequency information. The melt pool frequency may be modeled by the following relationship:

$$t_{n-1} = \frac{\sqrt{\frac{3\pi\rho V}{\gamma}}}{\sqrt{(n(n-1)(n+2))}} \quad \text{Eq. (22)}$$

Where n is the mode of oscillation, ρ is the density, V is the volume of the melt pool, γ is the surface tension, and t n−1 is the period of oscillation for the nth mode. In FIG. 11, the dependence of oscillation frequency as a function of melt pool size is shown for the primary or first mode of oscillation. The material selected for this calculation was titanium, commercially pure. Since the melt pool diameter for the additive manufacturing processes under consideration will be much smaller than 0.5 mm, it is expected that the melt pool frequency will be well over 1000 Hz. However, there is a practical limit to oscillations and the ability of the liquid metal to respond on account of attenuation and dispersion of oscillations.

Yet another kind of sensor data that could be examined is data collected on heating and cooling rates. The most common type of sensor in this category is a pyrometer. The pyrometer could be used in both the Lagrangian and Eulerian frames of reference. Also, run-time data from the machine tool or measurements from the Lagrangian frame of reference could be combined with process models to predict quantities such as cooling rate which are not directly observable in the Lagrangian frame. For example, suppose we have a direct measurement of the melt pool radius from the Lagrangian reference frame as described above. Then using this real time Lagrangian measurement together with the known machine parameters of beam power and travel speed, it is possible to calculate the cooling rate, i.e. the cooling rate as the beam moves past a specific point in the powder bed. This is normally a quantity best measured in the Eulerian frame, but with the combined measurement and modeling approach it is possible to approximate the same quantity using Lagrangian data only.

Figure 12:
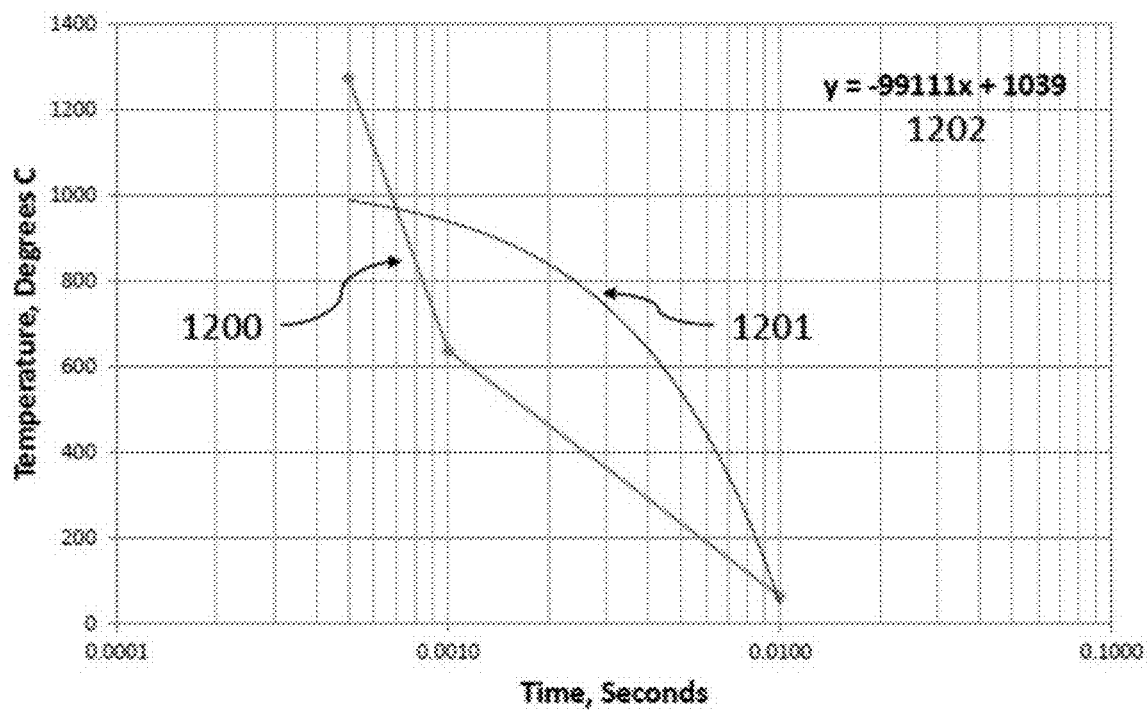
FIG. 12 shows the predicted cooling rate.

For example, by combining a melt pool radius measurement with Equation 4, we get the predicted cooling rate as shown in FIG. 12. This assumes that the material is a CoCr alloy commonly used in biomedical applications as well as some aerospace applications. In FIG. 12, 1200 is the predicted cooling rate for a point as close to the weld centerline as possible. There is one user-adjustable parameter, namely this radius away from the centerline at which the temperature is evaluated. It cannot be zero, because Eq. 4 is a point source solution and therefore the temperature at r=0 is infinite. Therefore this user-adjustable parameter can be calibrated by looking at the appropriate Eulerian data, as outlined in the flowchart is FIG. 4. The black best fit line 1201 is a linear best fit. In FIG. 12 1201 appears curved because of the log axis in time. The best fit equation 1202 shows a slope of −99111 degrees C. per second. In FIG. 12, the user-adjustable parameter has been set to r=1 micrometer. This was possible to establish only by a comparison to the Eulerian data.

Figure 13A:
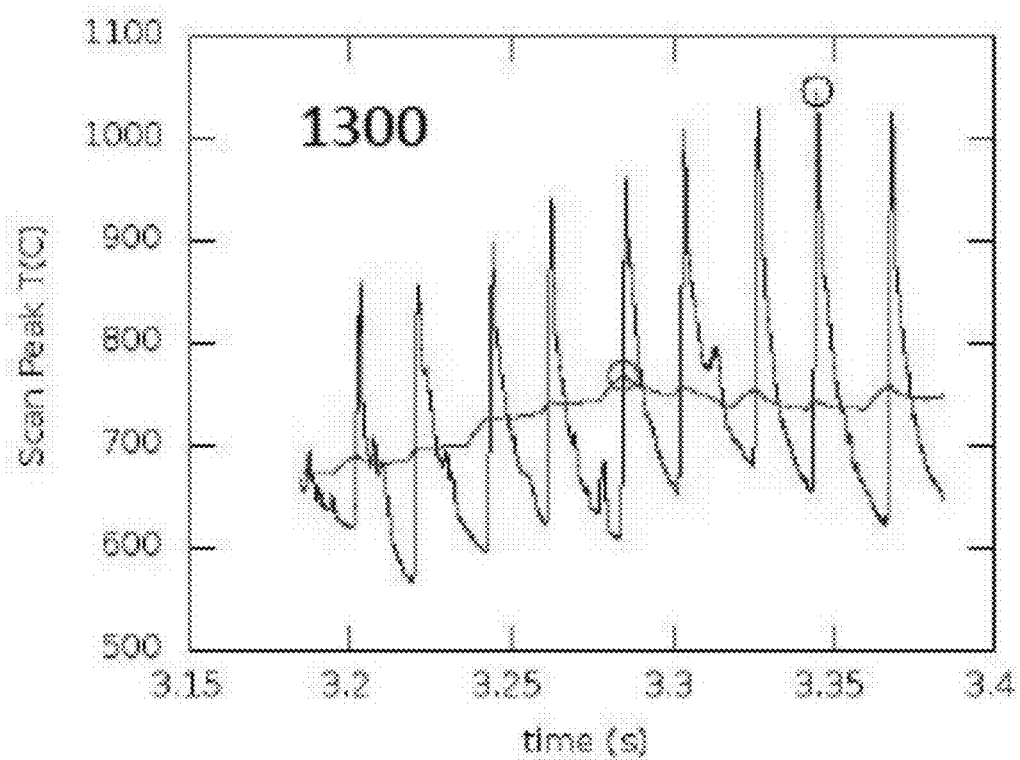
FIG. 13 shows experimental data derived from a Eulerian Sensor.
Figure 13B:
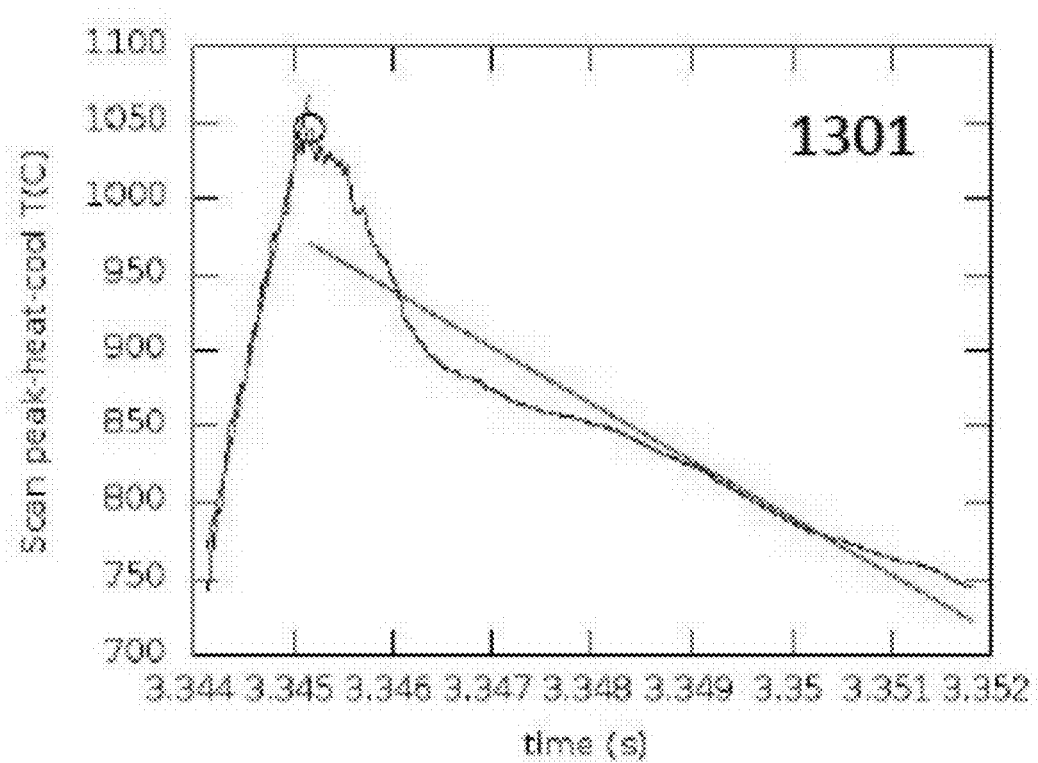

FIGS. 13A-13B show experimental data derived from a Eulerian Sensor. In FIG. 13A, 1300 shows the individual scans of the laser on the powder bed as they enter and exit the field of view of the pyrometer. 1301 shows an individual scan as observed by the Eulerian pyrometer. The heating and cooling rates are simply derived by taking the slopes of the heating (rising) and cooling (falling) portions of the curve shown in 1301.

Figure 14:
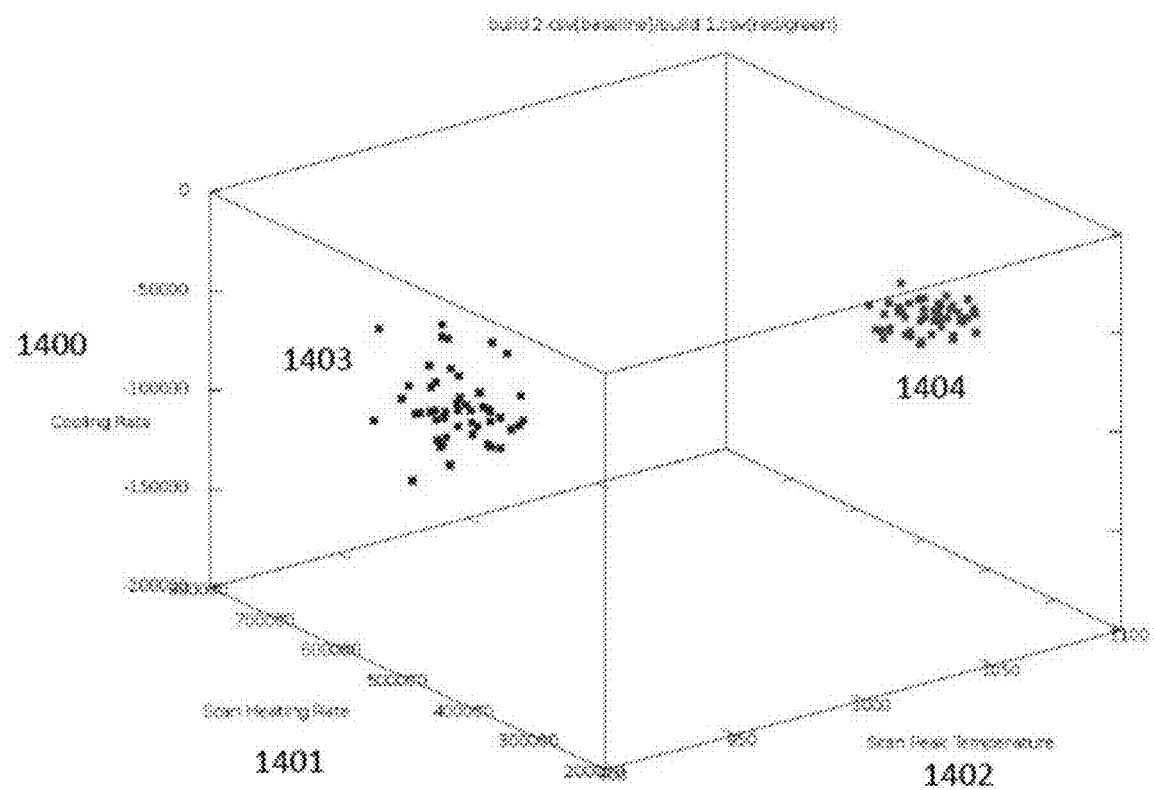
FIG. 14 shows specific scan cooling rate values on the vertical axis of a 3D plot.

FIG. 14 shows specific scan cooling rate values on the vertical axis of a 3D plot. The scan cooling rate 1400 is shown on the vertical axis of this 3D plot. The other two axes of the plot include the scan heating rate 1401 and the scan peak temperature 1402. There are two groups of data shown in FIG. 14. The chief difference between these two operating conditions is the scan peak temperature 1402. One grouping of data points namely 1403, has a lower peak temperature, whereas another grouping namely 1404 has a higher peak scan temperature. Both sets of data have a scan cooling rate of around 100,000° C. per second. In order to match the Lagrangian data and model prediction shown in FIG. 12, the radius was set to 1 micrometer so that the predicted data would match this experimental data as shown in FIG. 14. This is consistent with the methodology shown in the flowchart of FIG. 4. Now that this parameter has been set, the relation in FIG. 4 could be used for prediction of cooling rate using only Lagrangian and machine data. This illustrates one use of Eulerian data to calibrate a model prediction derived from Lagrangian data.

Phase Change Determination/Sensor Calibration

Another way to calculate heating and cooling rates is by identification of phase changes occurring within a Eulerian sensor field of view.

Figure 15A:
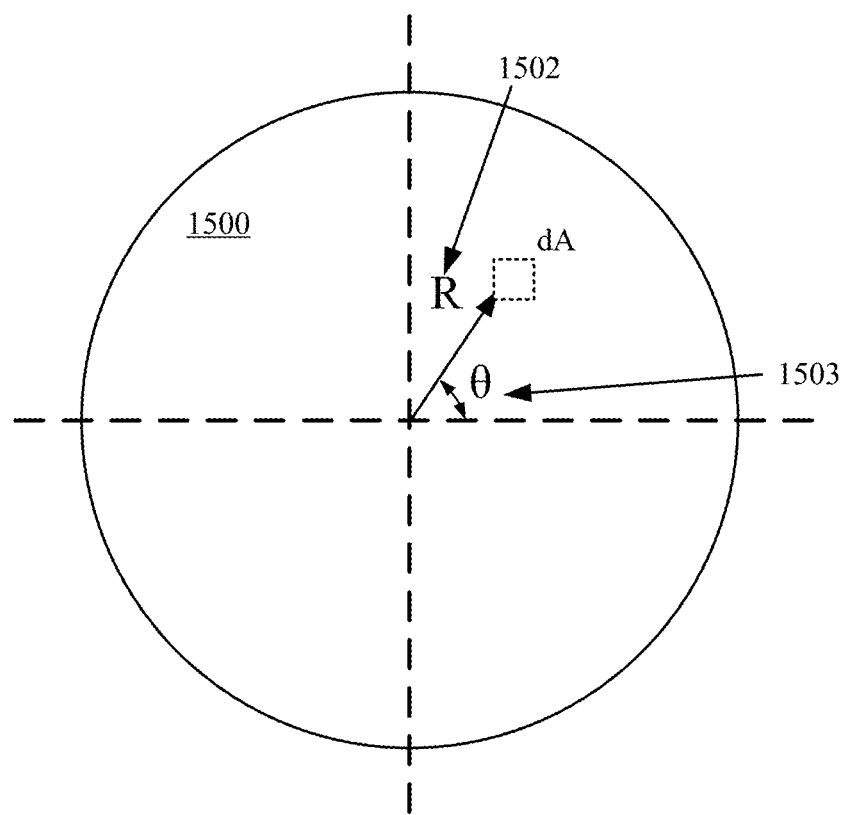
FIG. 15A shows an exemplary field of view of a pyrometer setup as a Eulerian sensor.

FIG. 15A shows an exemplary field of view of a pyrometer setup as a Eulerian sensor. In particular, a circular field of view 1500 is depicted. When the temperature field within field of view 1500 is variable and is a function of location as well as time, then each individual area element will contribute to the overall averaged temperature that is observed in proportion to its area as a fraction of the total area of the pyrometer field of view. The small differential area is schematically indicated in FIG. 15. The field of view 1500 may include a multitude of smaller areas dA that are radiating. In general these areas are dispersed at a given radius R from the center 202 and at a certain angular orientation θ within the field of view of the pyrometer 203.

Furthermore, each individual area may have a different emissivity that is a function of temperature.

Figure 15B:
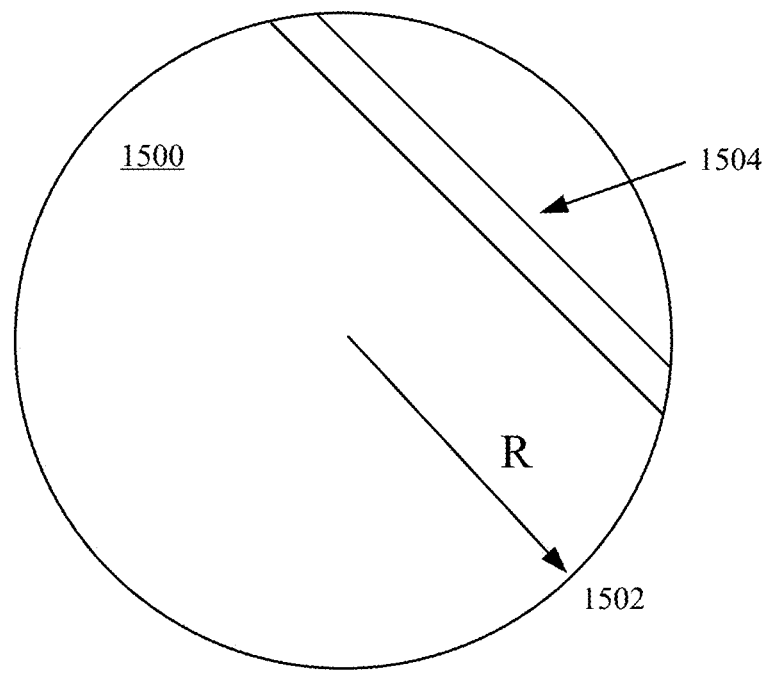
FIG. 15B schematically shows the field of view of the pyrometer and the track of thermally affected and melted material caused by the moving heat source.

FIG. 15B schematically shows the field of view 1500 of the pyrometer and the track 1504 of thermally affected and melted material caused by the moving heat source. The field of view 1500 of the pyrometer is shown as a circular field of view with a radius R 1502. The region that is heated and melted by the moving heat source is shown as a rectangular tract 1504, which intersects the pyrometer field of view 1500. Generally, this tract will vary in size, area and location where it intersects the field of view.

Figure 15C:
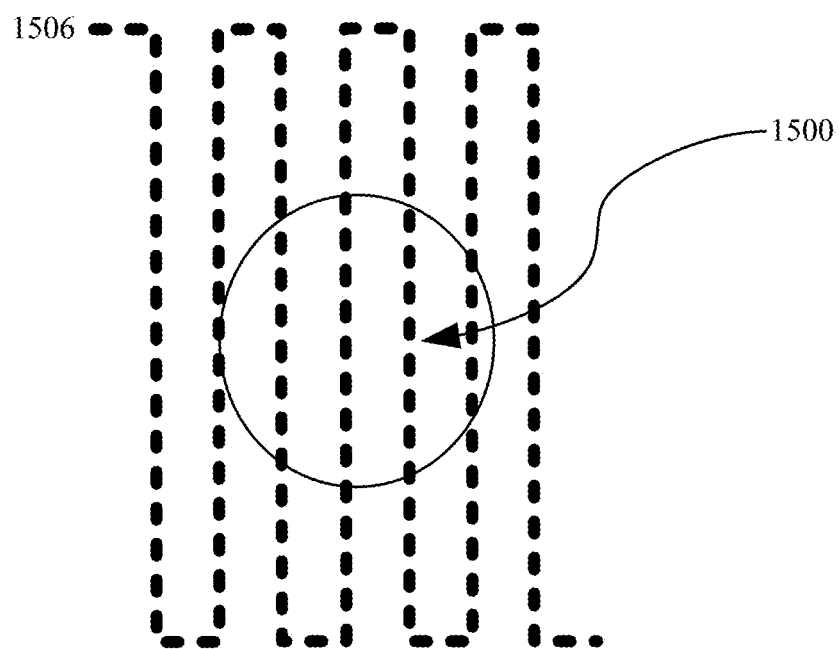
FIG. 15C shows an exemplary scan pattern that can be traversed by a heat source.

The heat source is not an instantaneous heat source, i.e. it is not instantly turning on and releasing a finite amount of heat instantaneously. Rather, the heat source is a moving, continuous heat source. Different areas within the field of view are constantly increasing and decreasing in temperature as the heat source is moving through the field of view sweeping out the heated areas 1504. Therefore, the observed temperature should be interpreted as a time-integrated average of the time-dependent thermal behavior of the hot and cold regions—each weighted by their area fractions. FIG. 15C shows an exemplary scan pattern 1506 that can be traversed by a heat source. As depicted, field of view 1500 can represent a relatively small portion of scan pattern 1506 and consequently, can only accurately quantify heating and cooling occurring within field of view 1500. It should be noted that other scan patterns are possible and can include tighter or looser scan patterns performed at various speeds with various power outputs. The scan rate, power and scan pattern all have an effect upon how much energy gets delivered during the additive manufacturing operation.

Figure 15D:
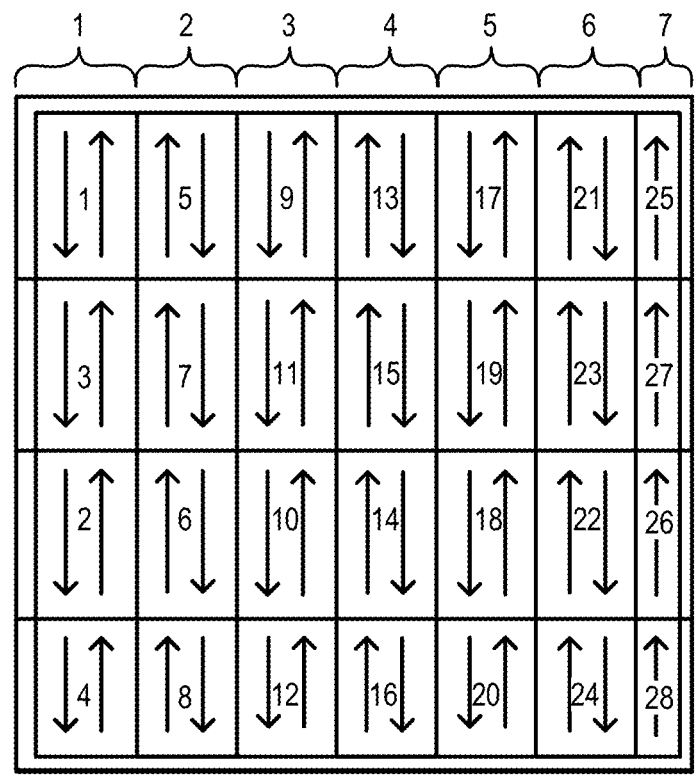
FIGS. 15D-15E show various alternative scan patterns.
Figure 15E:
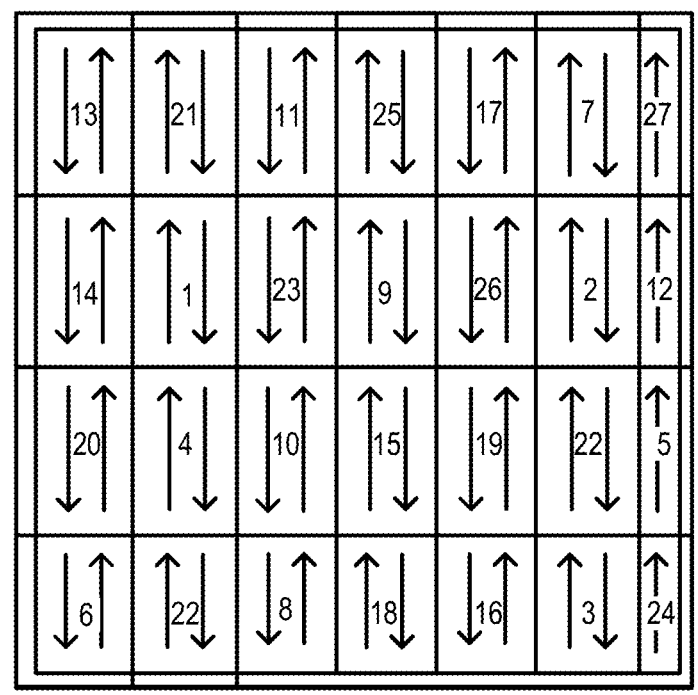

FIGS. 15D-15E show various alternative scan patterns. FIG. 15D shows how the scan pattern can be broken into smaller checkerboards which are scanned sequentially left to right and top to bottom. The numbers in each checkerboard indicate the order in which each checkerboard is scanned. In FIG. 15E, the same checkboard pattern is shown, but now the scan order for the individual checkerboards is randomized. Irrespective of the specific scanning pattern or scanning strategy involved, it is seen that the laser based process involves short, many short, discrete scan lengths with a start and a stop and a path length.

If a scan pattern similar to the ones depicted in FIG. 15D or 15E were being monitored by a stationary/Eulerian photodiode, the data coming back to the photodiode would have many, many individual signals each representing a given specific scan over a specific path length. It would be useful to separate out all of these signals according to their path length, as the apparent intensity of the signal as observed by the photodiode will be a function of this path length. This is because at the start of the scan, the photodiode intensity is zero or very small because the laser has just turned on. As the scan proceeds the scan generally becomes hotter and emits more light, so the photodiode intensity would increase slightly. There would of course be a natural range and scatter in the photodiode raw signal as the light intensity varies throughout the process due to the very chaotic nature of the laser/powder interactions as well as the chaotic motion of the molten metal and the changing view factor from this small hot spot to the photodiode.

Ways in which pyrometer data having a field of view substantially larger than the region that is hot, where the heated region is moving, and how to normalize such data so as to predict true temperature from observed temperature are discussed below.

Figure 16A:
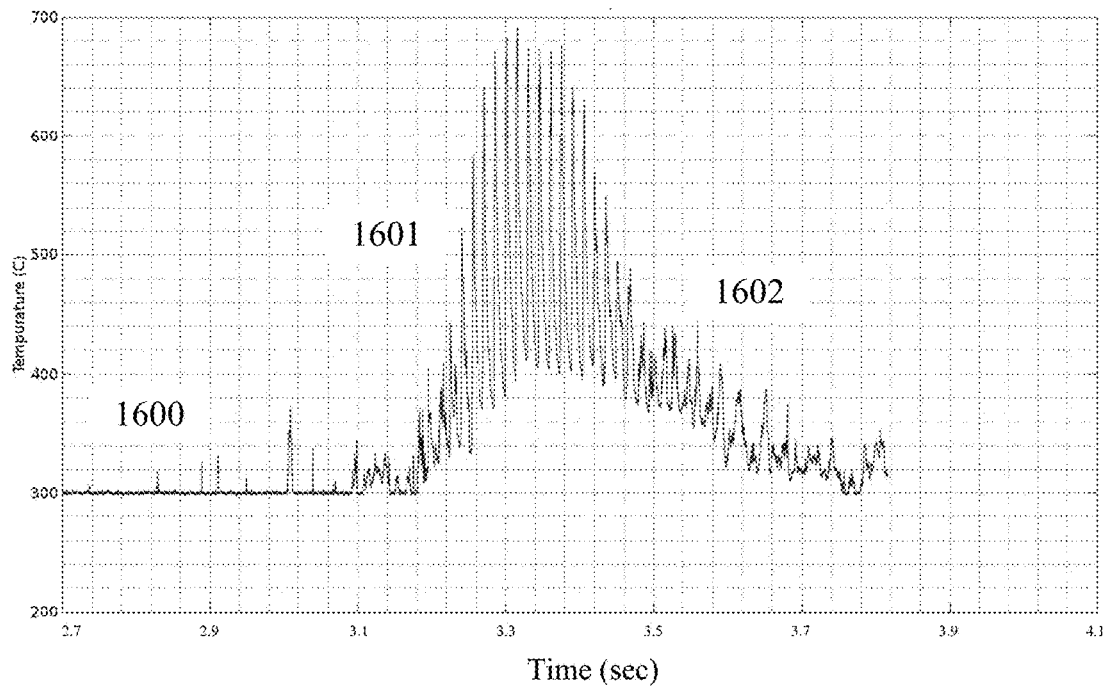
FIGS. 16A and 16B show the raw data from a fixed (Eulerian) pyrometer.

FIG. 16A shows the raw data from a fixed (Eulerian) pyrometer as multiple scans of a heat source pass through the field of view 1500. As the moving heat source moves into the field of view of the thermal sensor, there is a rise in the background temperature 1600. Eventually the moving heat source is fully within the field of view 1500, and there are higher temperature, rapid thermal excursions 1601. As the heat source then fades from the field of view and moves to other regions of the material, there will be a slower falling thermal transient 1602. The transients in FIG. 16A will have phase changes associated with them as well, but this is only visible or discernable at closer inspection of the more rapid, higher temperature thermal transients 1601.

Figure 16B:
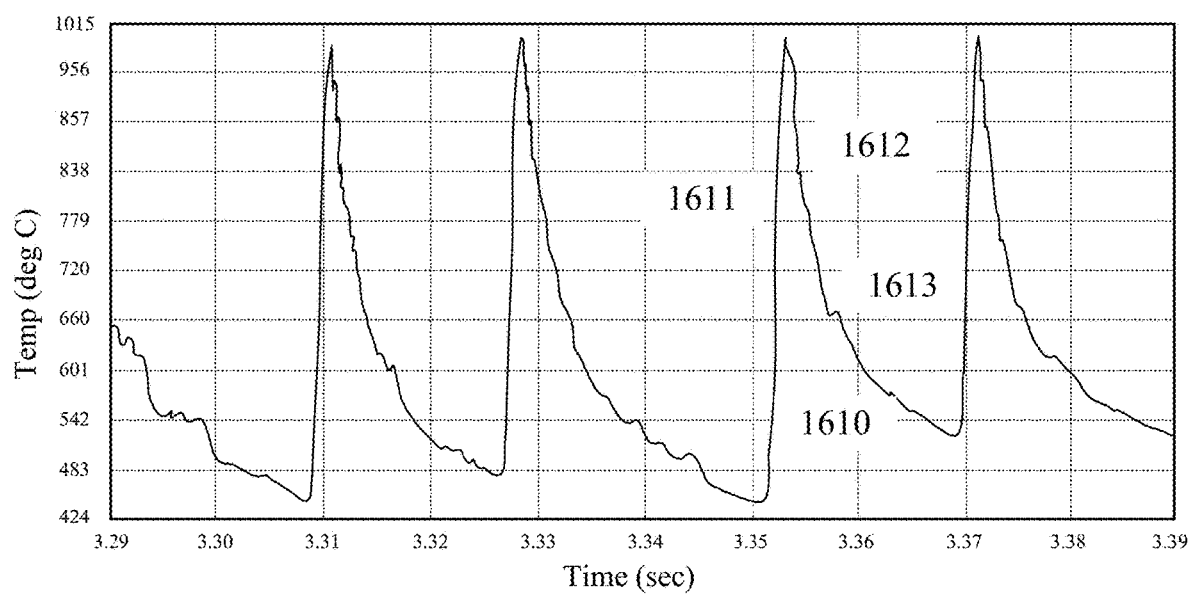

FIG. 16B shows a closeup of the faster transients from the representation shown in FIG. 16B that result from the moving heat source intersecting the field of view of the thermal sensor. 1610 shows a specific peak which represents one instance of a transit event in which the heat source passes along a path that extends across the sensor field of view (e.g. see path 1504 depicted in FIG. 15B). 1611 is the heating portion of this curve which in general will be very rapid. 1612 shows the cooling portion of this curve which will also be rapid, but not as rapid as the on-heating portion. 1613 shows a thermal arrest or inversion, which is associated with a phase change in the material, which in the case of the on-cooling curve would be the liquid to solid transition.

For thermal measurements in which the field of view of the thermal sensor is larger than the hot region being measured and where there are phase changes, there are two primary intervening factors which should be accounted for when considering the temperature measurements: (1) the apparent observed temperature will be lower than the actual temperature of the hot region because the field of view of the thermal instrument is the temperature from cold regions as well as hot regions; and (2) the emissivity of a liquid will be very different than the emissivity of a solid when considering the case of a liquid—solid phase change.

Figure 17A:
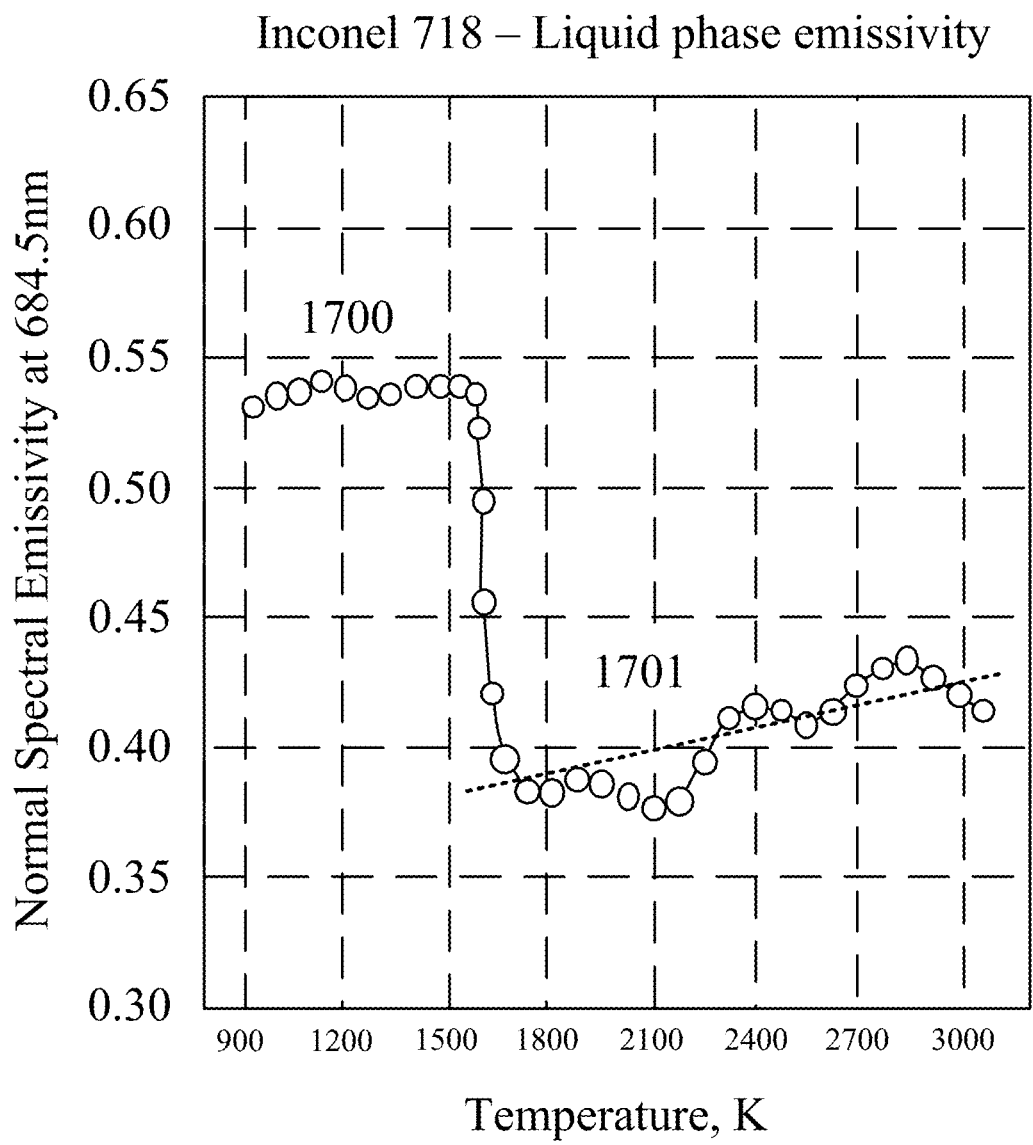
FIG. 17A shows a graph of spectral emissivity as a function of temperature.

FIG. 17A shows a graph of spectral emissivity as a function of temperature for Inconel 718 (a Nickel-Chromium Alloy used in some additive manufacturing operations). One with ordinary skill in the art should appreciate that the substantial changes in emissivity depicted by FIG. 17A help show why changes in phase should be accounted for to help optically determine an accurate temperature. FIG. 17A shows how the emissivity of the solid 1700 is generally higher than the emissivity of the liquid 1701. In this case, the solid was a polished wire, so its emissivity was low to start with. Oxidized surfaces are expected to have somewhat higher emissivity. The emissivity of a powder bed is a more complex phenomena and takes into account the highly irregular surface geometry of power. Powder beds often have a very high emissivity which can be experimentally measured. The emissivity can also be calculated by making an assumption of spherical powders and assuming that the holes are cylindrical, and solving for the geometrical effects, this reference predicts the combined emissivity of the surface comprised of solid surfaces and holes. In general, the total emissivity is the area-fraction weighted sum of the emissivity of the holes and the solid surface.

Figure 17B:
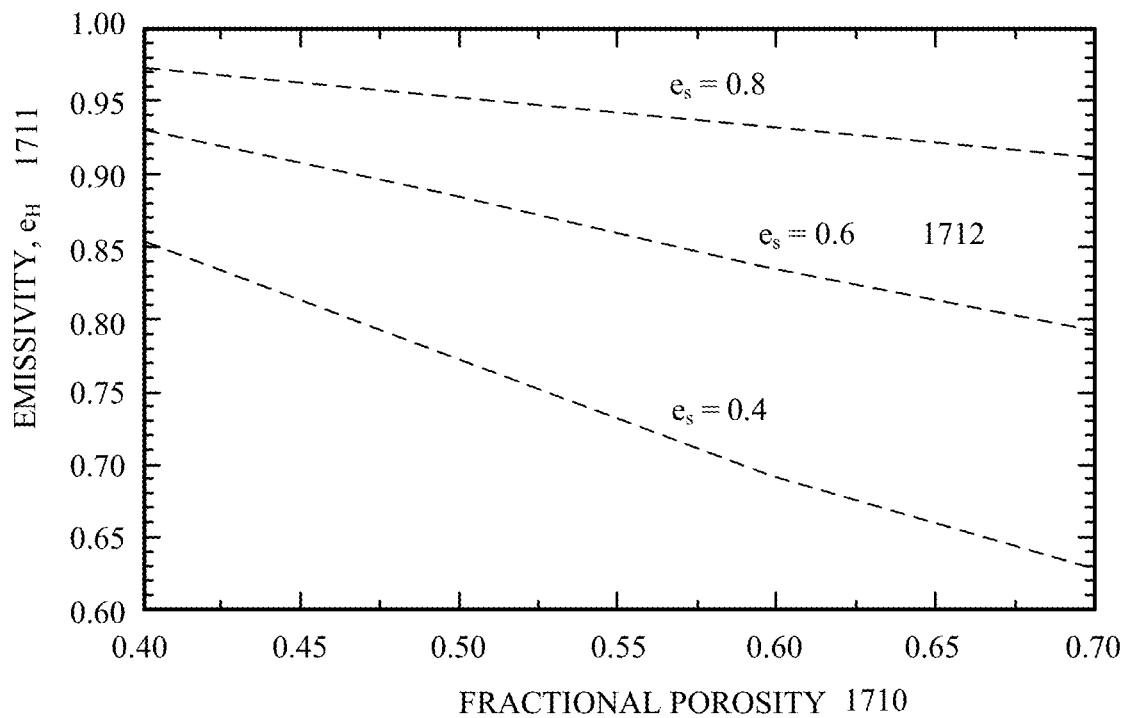
FIG. 17B shows a theoretical calculation of the emissivity of the a metal powder.
Figure 17C:
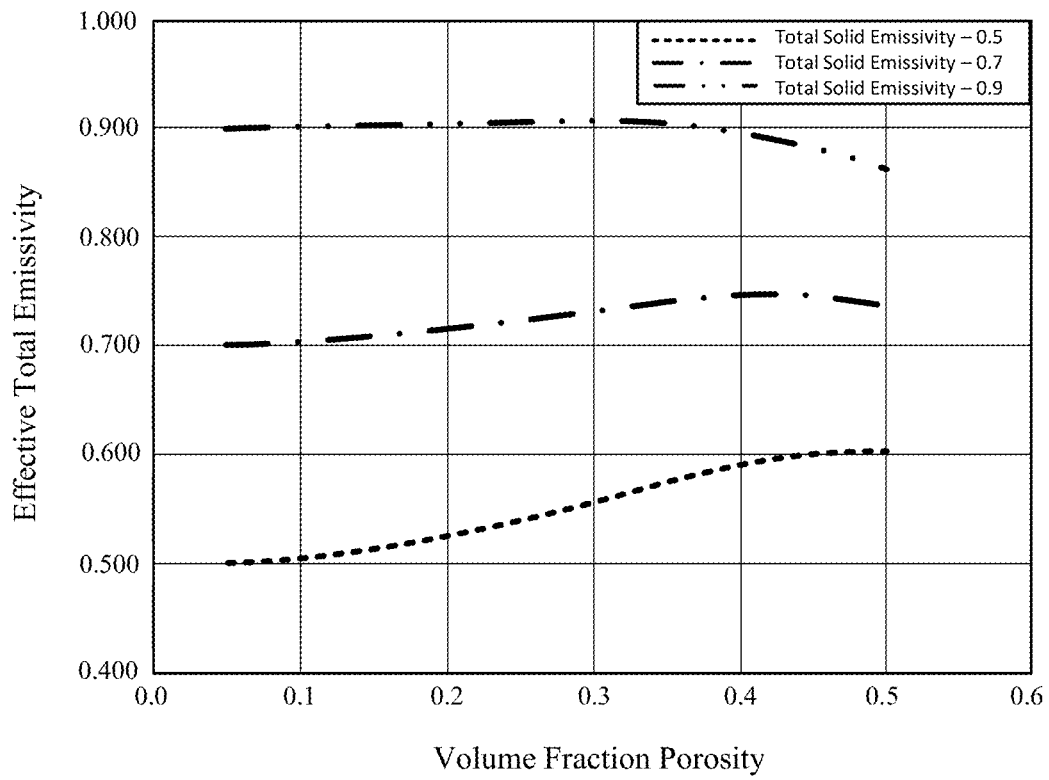
FIG. 17C shows a graph depicting a relationship between volume fraction porosity of the powder for powders having varying total solid emissivities.

FIG. 17B shows a theoretical calculation of the emissivity of the holes, which could approach a perfect black body. Axis 1710 is the fractional porosity in the powder bed. 1711 is the effective emissivity of the holes, i.e. the regions that are not occupied by solid material. 1712 shows the effect of varying the solid material emissivity also as a function of the powder porosity. It is seen that the emissivity of the hole regions could be very high. However the total emissivity is an area fraction weighted average of the hole emissivity and the solid emissivity. Consequently, it should be appreciated that the emissivity of the powder can be widely varied by adjusting the average of the hole emissivity and the solid emissivity. Table 4 below along with FIG. 17C give examples of how this volume fraction porosity of the powder varies with respect to effective total emissivity and total solid emissivity.

TABLE 4

Volumetric Porosity vs Effective Total Emissivity

| Volumetric Porosity Level | Total Emissivity-0.5 Solid Emissivity | Total Emissivity-0.7 Solid Emissivity | Total Emissivity-0.9 Solid Emissivity |
|---|---|---|---|
| 0.05 | 0.501 | 0.701 | 0.900 |
| 0.1 | 0.505 | 0.703 | 0.901 |
| 0.15 | 0.513 | 0.708 | 0.902 |
| 0.2 | 0.525 | 0.715 | 0.904 |
| 0.25 | 0.540 | 0.723 | 0.906 |
| 0.3 | 0.558 | 0.733 | 0.906 |
| 0.35 | 0.576 | 0.741 | 0.904 |
| 0.4 | 0.591 | 0.747 | 0.897 |
| 0.45 | 0.601 | 0.746 | 0.883 |
| 0.5 | 0.604 | 0.738 | 0.862 |

The additional correction that should be made to data from a thermal sensor in which the hot region is considerably smaller than the field of view is the area fraction contribution of hot and cold elements to the overall thermal sensor signal. If there are two objects in the field of view of the pyrometer and they have different emissivities, temperature, and areas, then the total radiant flux reaching the sensor, assuming that the Stefan-Boltzmann Law applies, is approximately proportional to the following quantity:

$$E_{TOTAL} \propto \varepsilon_1 A_1 T_1^4 + \varepsilon_2 A_2 T_2^4 \qquad \text{Eq.(23)}$$

Figure 17D:
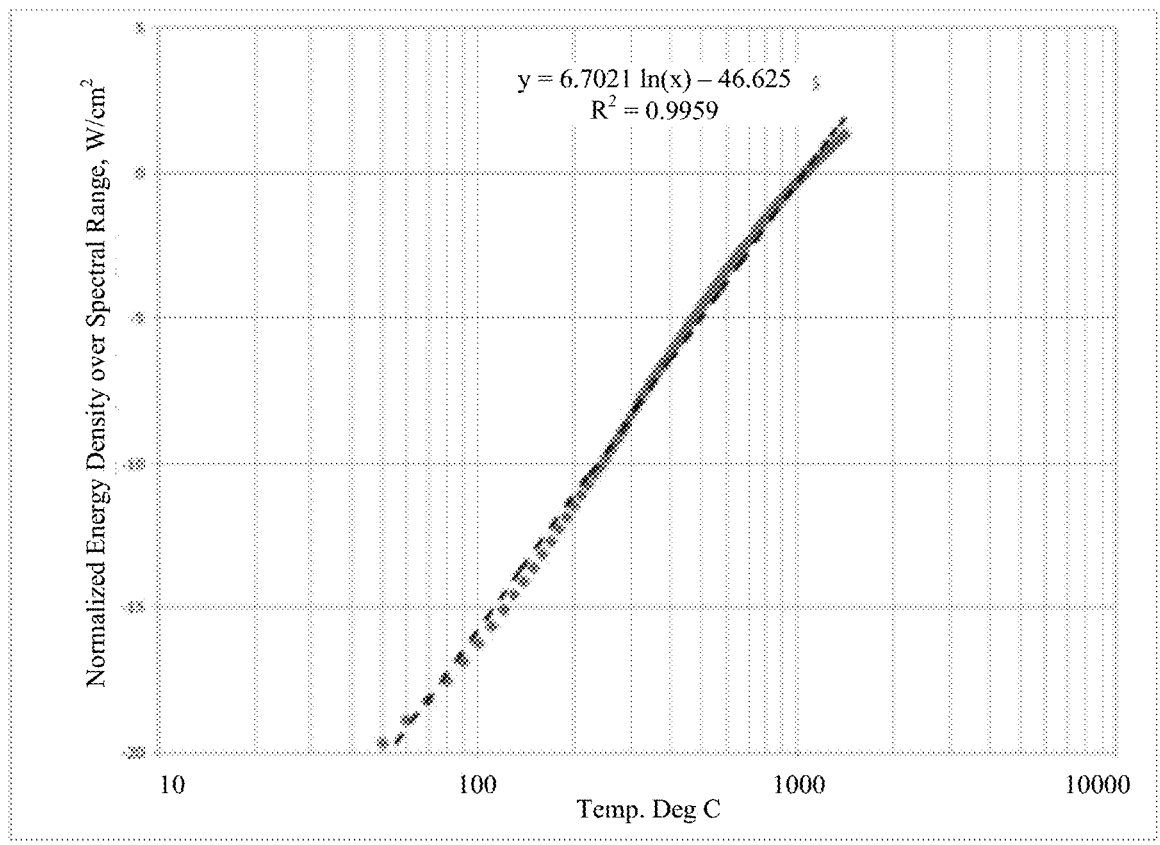
FIG. 17D shows a graph depicting normalized energy density vs temperature.

If we consider the typical numbers encountered in Additive Manufacturing, then the ratio of the areas will be approximately 0.01, since a typical spot size for a laser used in AM is on the order of 100 microns (0.1 mm) whereas the spot size of the field of view of the pyrometer is closer to 1 mm. For a specific sensor over a specific spectral range, the difference in power emitted at different temperatures is even more extreme than that given by the Stefan-Boltzmann Law, since this law looks at emission over all frequencies. For example if we limit emissions to just those occurring between wavelengths 1.58 microns to 1.8 microns, then the resulting temperature vs. power density (assuming a solid angle of π steradians) when plotted in a log plot is shown in FIG. 17D. According to the slope of the best fit line 1100, we see that over this spectral range the more appropriate relationship between power density and temperature is:

$$E \propto T^{6.7} \qquad \text{Eq.(24)}$$

The peak temperature will be on the order of 2000K, whereas the base temperature will be closer to 500-750K. Therefore the ratio of the temperatures raised to the 6.7 power is approx. in the range 1000-10000. When multiplied by the ratio of the areas, the hot spot is 10-100 times the signal intensity for a given emissivity. So the area correction factor over the spectral range of the thermal instrument described above varies from 1% to 10% depending on the base temperature. Therefore for this variety of additive manufacturing process and for pyrometers where the field of view is 1 mm or less as compared to a 100-200 micron melt pool, the effect of cold regions within the field of view may be ignored.

An additional correction that can be made to raw data is an emissivity correction. For a given thermal sensor, it will assume an emissivity. This assumed emissivity will in general not be the correct emissivity for the material over its entire temperature range. For example we have already seen that on melting there is a dramatic drop in emissivity. Therefore, the temperature can be corrected based on emissivity, and this is done using the following relationship:

$$\frac{1}{T_{NEW}} = \frac{1}{T_{MEASURED}} + \frac{\lambda_{EFF}}{C_2} \cdot \ln\left(\frac{\varepsilon_{NEW}}{\varepsilon_M}\right) \qquad \text{Eq. (25)}$$

There $T_{NEW}$ is the new temperature at the correct emissivity $\varepsilon_{NEW}$, $T_{MEASURED}$ is the measured temperature at the set instrument emissivity of $\varepsilon_M$, $\lambda_{EFF}$ is the effective wavelength of the instrument, for example it could represent the midpoint of the wavelength range over which the instrument is measuring, and $C_2$ is the second Planck Constant.

Figure 18:
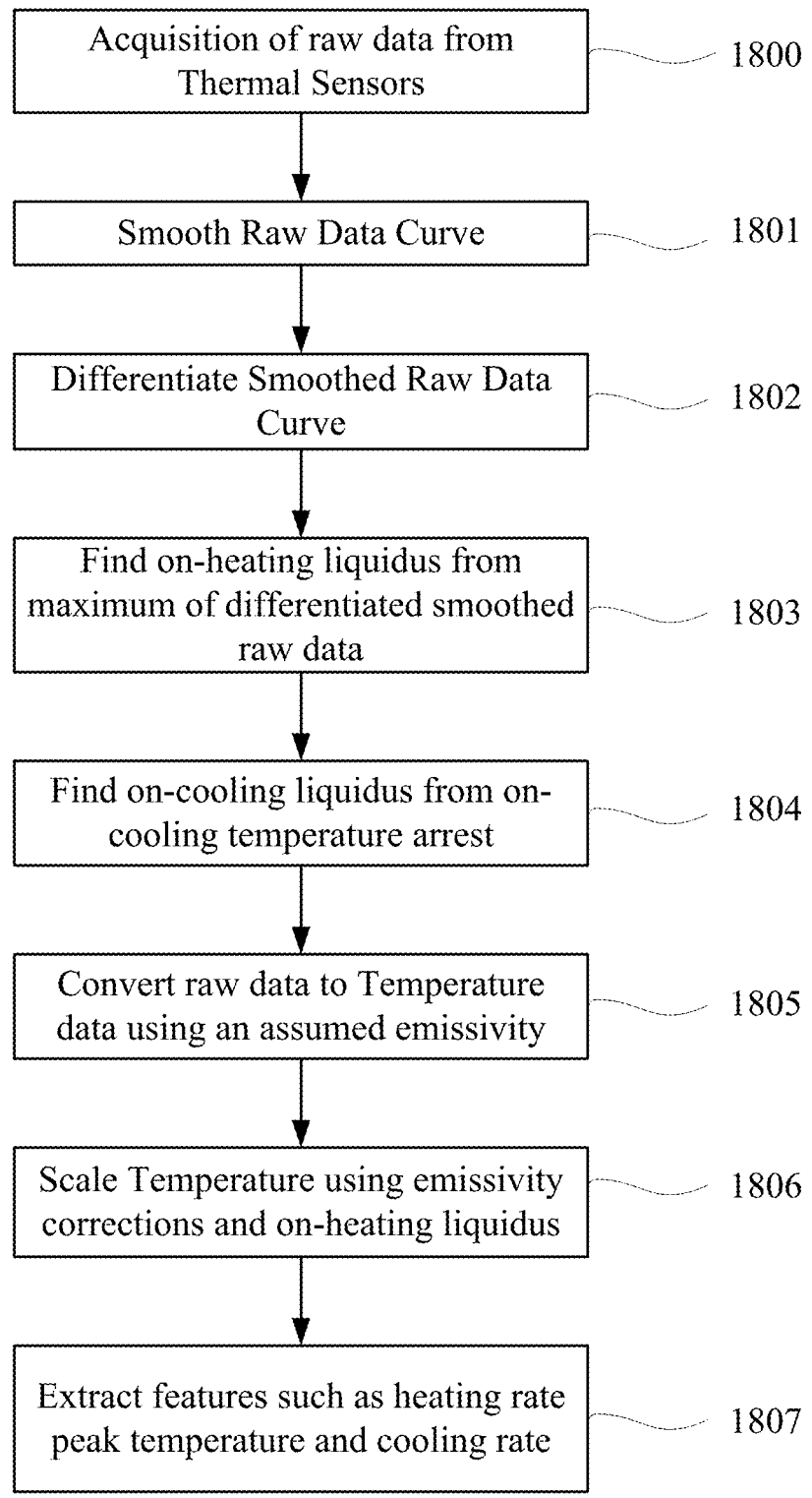
FIG. 18 shows a flowchart describing in detail how thermal sensor data from various locations in the additive manufacturing build plane can be used.

FIG. 18 shows a flowchart describing in detail how thermal sensor data from various locations in the additive manufacturing build plane can be used to derive features which are useful for quality inference and quality control for the AM process as a whole. At 1800, raw data is collected from various thermal sensors. The raw data is collected and them numerically smoothed at 1801 and then differentiated at 1802. The on-heating portion of the thermal curve will show a break in slope at some point during the temperature rise. This is caused by melting as melting is the only physical phenomenon which could account for this break in slope. Therefore at 1803 the maximum in the derivative data will be used to find the location where melting occurs and this point in the raw data will be associated with the value of the equilibrium liquidus for the alloy in question. Similarly at step 1804, the on-cooling liquidus will be identified based on a thermal arrest associated with the solidification process. In general the on-heating and on-cooling liquidus points will not be the same. At 1805 the raw data can be converted to temperature data by circuitry of the pyrometer by using a default or assumed emissivity. At 1806 the temperature data is scaled by comparing the measured on heating liquidus to the known melting temperature of the material and then using the identified on-heating and on-cooling liquidus positions to further adjust the temperature in accordance with changes in emissivity due to phase changes. At 1807 a temperature corrected and emissivity corrected thermal curve is produced that can be used to drive features such as heating rate, peak temperature, and cooling rate.

Figure 19A:
FIGS. 19A-19F show how the processes described with regards to FIG. 18 can be applied to real temperature readings
Figure 19B:
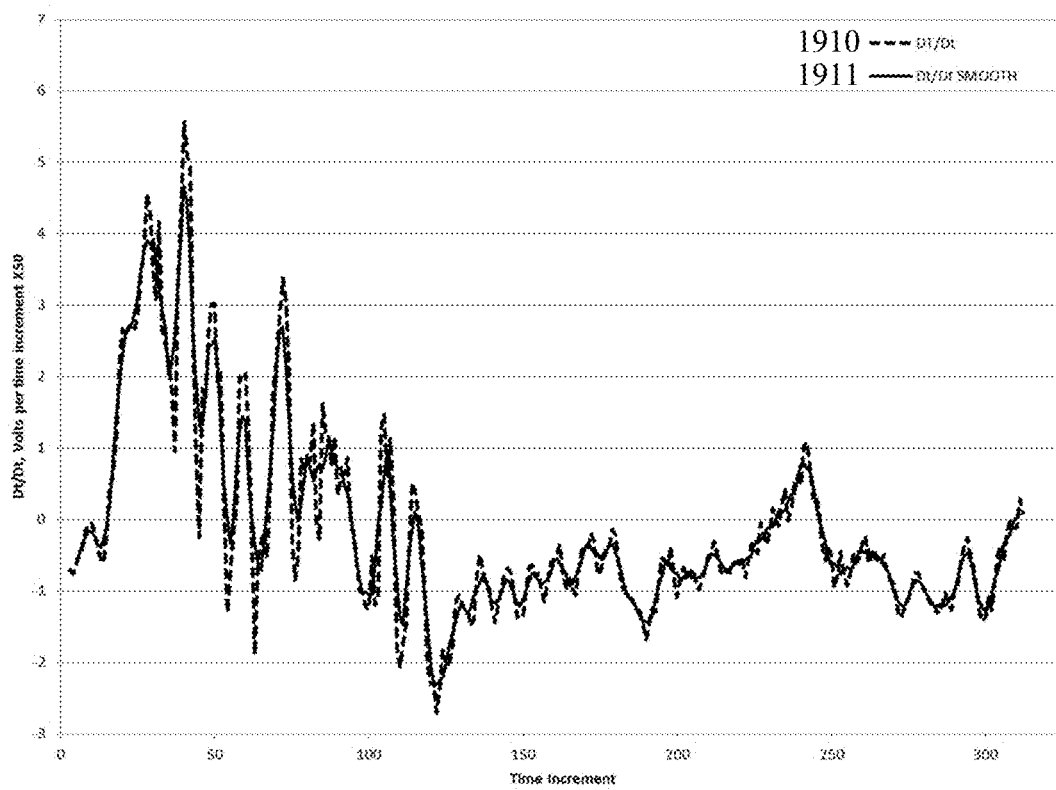
Figure 19C:
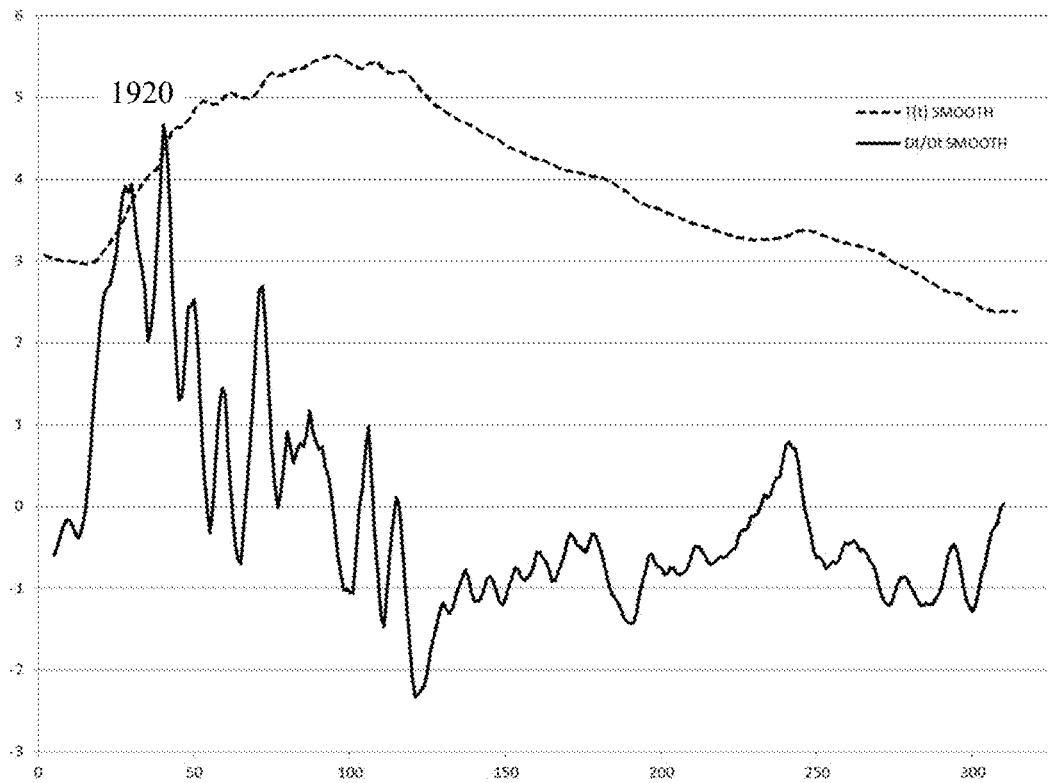

FIGS. 19A-19F illustrate how the process described in FIG. 18 can be applied to real temperature readings. FIG. 19A shows a raw thermal trace from an actual AM process involving the sintering of nickel-based superalloy IN-718 (see FIG. 17A). It shows the raw data 1900 as well as a smoothed curve 1901. In FIG. 19B, the derivative data is similarly shown, but the y-axis of the derivative has been scaled by 50 to make it more visible. Similarly 1910 shows the derivative data and 1911 shows a somewhat smoothed version. These are put onto the same plot in FIG. 19C where it can be seen that the maximum 1920 in the derivate occurs at time increment 40. This location on the temperature data will be assigned as a the location of the on-heating liquidus temperature, because after that point the temperature drops as more and more liquid is present and the heat transfer to the surrounding powder bed is greatly enhanced.

Figure 19D:
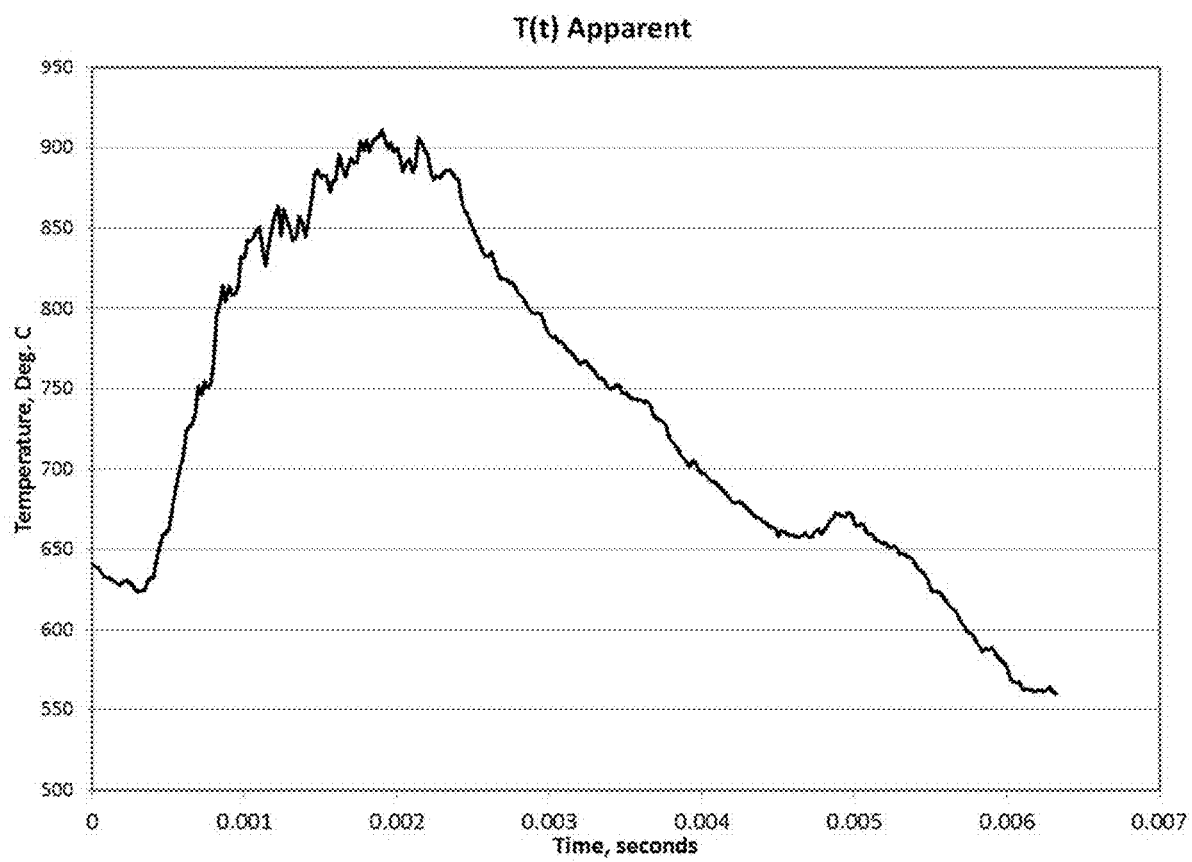
Figure 19E:
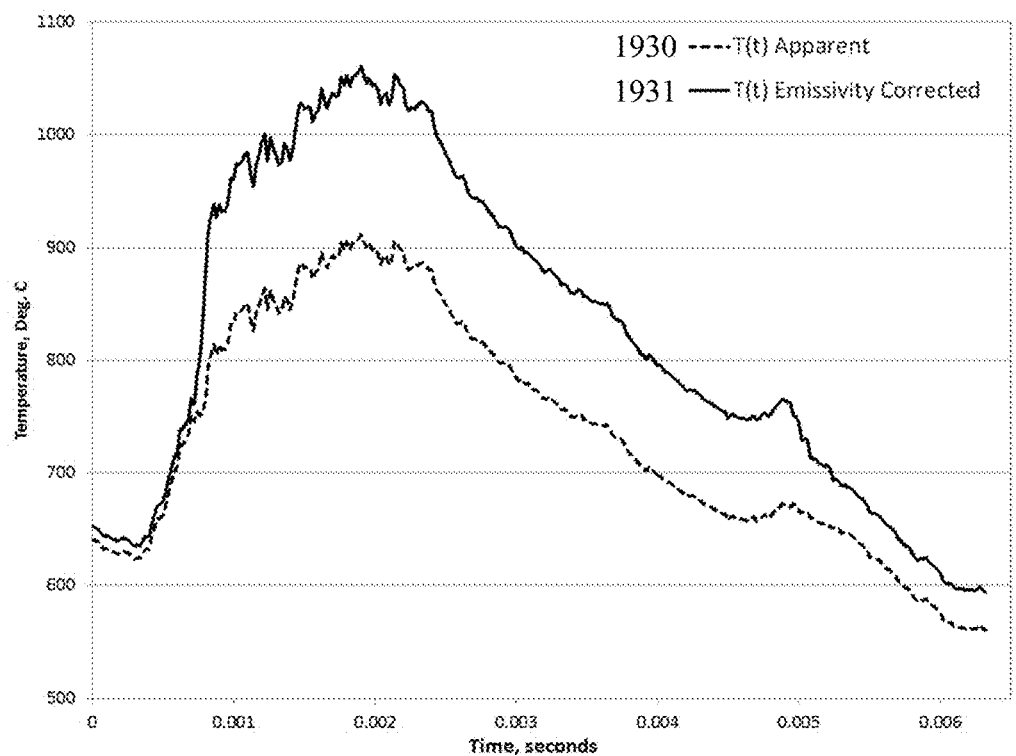

FIG. 19D shows the raw data converted to apparent temperature based on an assumed instrument emissivity setting of 0.9. Also the time increments have been converted to time based on a sampling rate of 50 kHz. This is now the starting point for corrections that are to be made. First we note that the location of the first derivative maximum is assumed to the liquidus temperature. Now the emissivity correction can be made. The assumed instrument emissivity was 0.9. For a IN-718 powder bed the more accurate assumption for emissivity is 0.8 So this correction is made for temperatures up to the liquidus temperature. For temperatures above that, the emissivity will be assumed to be low, namely 0.4 based on the data from FIG. 17A. The results of this emissivity correction are shown in FIG. 19E. With the original apparent temperature 1900 and the corrected apparent temperature 1931. Now this emissivity corrected temperature is scaled by the liquidus temperature location.

Because the liquidus temperature is assumed to be 1336deg C. and the apparent temperature at the liquids temperature location is 809deg C., the scaling factor becomes 1336/809=1.65. Applying this scaling factor to FIG. 19E provides the results depicted in FIG. 19F. We can now derive a variety of features from this curve that are of significant interest for the purposes of establishing whether or not the process is under control. 1940 shows the point at which heating starts. 1941 is the liquidus temperature on heating. The heating rate between these two points is a feature of significant interest as it is the heating rate up to the melting point of the material on heating. From the data in the FIG. 19F, we find that this heating rate is (1336 C–964 C)/(0.0008 s–0.00034 s)=808,695 C/s. The in FIG. 19F we see that the peak temperature 1942 is 1610 C. The on-cooling liquidus location is the location of the first thermal arrest 1803 on cooling, and we see that from the data in FIG. 19F this temperature is at 1288 C, which is significantly below the equilibrium liquidus of 1336 C. The solidus feature 1944 is at a temperature of 1160, which again is below the equilibrium solidus for this alloy. The cooling rate between 1943 and 1945 is the most important cooling rate from a metallurgical point of view as it is the average cooling rate during the alloy solidification. 1945 is where the projection of the solidus line hits the cooling curve on cooling. From the data in FIG. 19F, we find that this cooling rate is between points (1160 C–1288 C)/(0.0049 s–0.00434 s)=228,571 C/s.

Figure 19F:
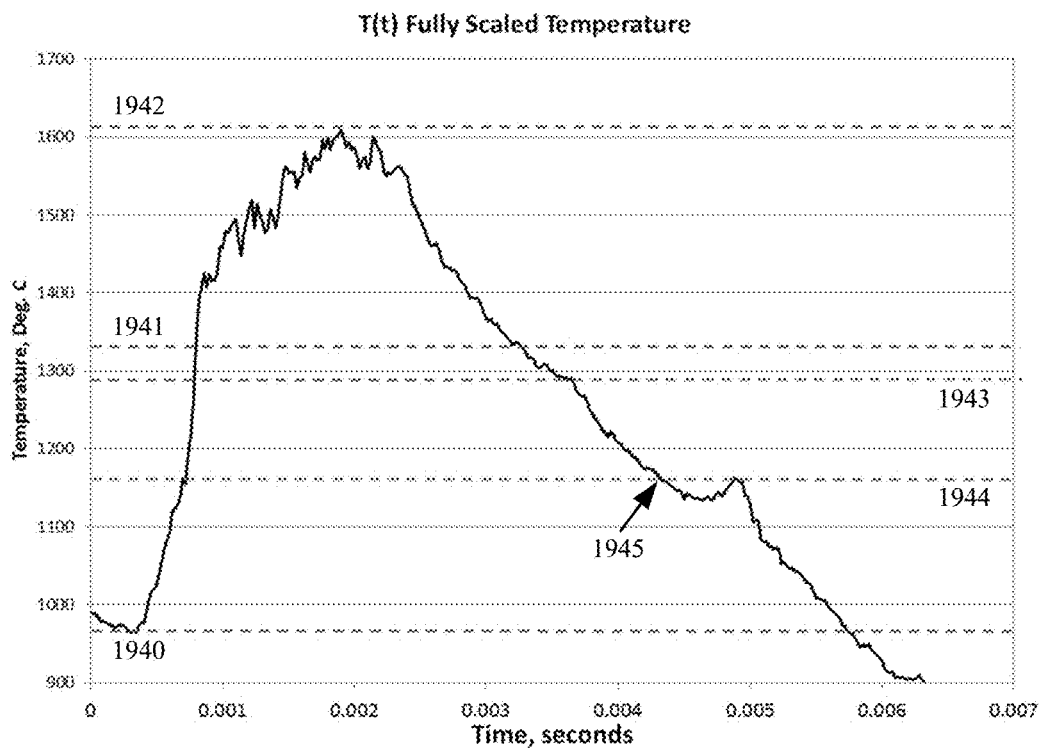

These features, the heating rate the cooling rate, and the peak temperature as defined above and in reference to FIG. 19F are the most metallurgically important features which could be tracked scan by scan, layer by layer. These features could be used to establish a statistical process control methodology and could answer the question, "is the process under control?"

Process Control

Process control is a very broad and general topic which could have multiple meanings and connotations. FIG. 20 shows the hierarchy of process control from the highest level requirements down to the lowest level real-time control loop. The Engineering End Use Environment 2000 ultimately determines the requirements placed upon any part or system by specifying the functional and operational conditions under which the part will be used. This could include but is not limited to operating temperature and/or pressure, specific geometric envelopes that the part can fit into, forces and torques applied on the part, the number of cycles of oscillating stress that the part will be subjected to over a given period of time, etc. This is turn drives the definition of Design Intent 2001. Design Intent 2001 is the quantification of specific metallurgical, geometric, and mechanical properties and attributes that the part must possess so that it could successfully function in the engineering end use environment 2000. Design Intent 2001 could be derived from modeling or from significant prior experience or expert knowledge to predict what part properties and attributes will be required and to specify those. The Quality Specification 2002 outlines the methods and techniques by which the part attributes specified by Design Intent 2001 will be actually verified or measured. The various specific techniques, work instructions, and detailed execution steps are further elucidated in the Inspection Protocols and Standards 103 which could also include standards and methods for calibration of non-destructive or destructive inspection techniques.

The next step in quality assurance, quality control and process control is the Process Qualification 2004. This is generally a very lengthy step in which the all the inputs to the manufacturing process are systematically varied or adjusted, the output of the manufacturing process and specifically those attributes called out in the Quality Specification 2002 are measured according to the techniques outlined in the Inspection Protocols and Standards 2003, and the results are compared against the requirements outlined in the Design Intent 2001. This can be a highly iterative, time-consuming, and expensive process as many parts and large samples may be needed to ensure statistical relevance. This is because in the traditional approach to quality assurance, quality control and process control, the individual sample is a part, and therefore entire parts must be sacrificed during the Process Qualification 104 to ensure that the manufacturing process is capable of producing parts that will meet Design Intent 101 as specified by measurable attributes in the Quality Specification 2002 and as measured by the specific techniques prescribed in the Inspection Protocols and Standards 2003.

Assuming that the Process Qualification 2004 is successful and a set of process inputs, the traditional approach to manufacturing quality assurance, quality control and process control then attempts to "lock down" manufacturing processes through the formulation and implementation of a Manufacturing Process Specification 2005 that outlines specific manufacturing process inputs, parameters, or other conditions that purportedly will enable the manufacturing process to perform in a consistent manner in perpetuity so that the manufacturing process determined in the Process Qualification 2004 will produce parts capable of meeting Design Intent 2001 on an ongoing basis.

There are two additional measures which are taken in the traditional approach that further try to ensure that the Manufacturing Process Specification 2005 will result in acceptable parts which meet Design Intent 2001. The implementation of Process Control 2006 in a more general sense consists of specific work instructions, engineering controls to ensure that manufacturing or machine settings cannot altered once established, or other administrative controls which prevent unauthorized alteration of the manufacturing process. Also, the vast range of Lean Manufacturing tools as well as Continuous Improvement tools such as mistake-proofing, 5-S, Kaizen, etc. falls into this category, as do the traditional methods of tracking and quantifying quality such as X-R charts, Pareto charts, etc. These are all generally and widely construed as Process Control 2006 in the traditional sense.

For some manufacturing processes even in the traditional mindset, such Process Control 2006 is found to be deficient and not sufficient to ensure that the Manufacturing Process Specification 2005 will always produce components capable of meeting Design Intent 2001. For this smaller and more limited set of manufacturing processes, and additional and final step is taken, namely that of Real Time Process Control 2007. This step involves the sensing of real-time information on-machine, the processing of this data in real-time, a decision-making algorithm that is capable discerning normal or expected states of the process from those that are off-nominal or unexpected, and finally a control mechanisms that allows the inputs to the manufacturing process to be automatically or perhaps even autonomously adjusted so as to continually ensure that the output of the manufacturing process is within known bounds.

In the current approach as described by FIG. 20, there are two aspects which are implicitly embodied in the term 'process control:' i) is the process under control, and ii) the means by which to control the process. The first aspect deals with processes that could be considered under a statistical state of control, i.e. the process is sufficiently reproducible that with controlled inputs that have known uncertainty, the process is capable of producing consistent outputs with measurable attributes and quantified uncertainty in those measurements. The second aspect deals with the procedural, administrative, technical, and machine aspects of controlling a process either through administrative procedures, simple open loop controls, or through sensing and active real time feedback control.

This present invention will address these two aspects of process control but will do so in a technical and real-time manner as opposed to a procedural or administrative manner. The former involves sensing, processing of data, making quality inferences by comparison to a standard, and for the case of real-time control making changes in real-time to machine parameters or inputs. The former involves setting up machine parameters once and "locking them down" under the assumption that static process inputs will result in a state of control. This administrative method may work for other manufacturing processes but is not well suited to process control for additive manufacturing. In particular, small errors in an additive manufacturing process can ruin parts that take many hours to build, making any advantage that can save time by aborting a ruined part early or adjusting the operation to salvage an off-nominal part is desirable.

Critical Processing Times and Sampling Rate for Real-Time Data Acquisition

The data collection for any real-time assessment of process control or implementation of real-time control should be commensurate with the timescale of the physical behaviors being controlled. It is seen that the thermal diffusion times are the characteristic times that are the longest and therefore are rate limiting. The other behaviors are essentially instantaneous in comparison. The characteristic time that is perhaps of greatest interest to the as-deposited microstructure is the solidification time, or the time over which the transition from liquid to solid occurs. If there are defects, porosity, etc. that is trapped in the solid from the liquid state, it would occur over this timescale. Therefore this is a timescale that would be important to capture for any real-time monitoring system.

The solidification time varies from $10^{-3}$ seconds to $10^{-5}$. Therefore it is reasonable to assume that a typical time might be in the range of $10^{-4}$ seconds. This would correspond to a frequency of 10,000 Hz for the highest frequency at which the process could change in a manner that could directly impact quality. It is also seen that for a large number of cases of interest, the solidification time in additive manufacturing is on the same order of magnitude as the Rayleigh time for the relaxation of a liquid oscillation in the weld pool. This is critical as well because if there is some anomaly in the fluid flow behavior of the weld pool and if such an anomaly gets "frozen in" by solidification, it would be important to have a data acquisition system capable of seeing both potential anomalies over both time scales.

The fact that these timescales are of similar order of magnitude is convenient in that a common sampling rate could be chosen that would ensure the capture of both phenomena. However according to the Nyquist Criterion, it is important to oversample by at least a factor of two in terms of the sampling rate required to observe any given physical behavior. Therefore the real-time data sampling rate should be at least 20,000 Hz and preferably higher. Therefore it is seen that a sampling rate of 50,000 Hz will be sufficient to capture in high fidelity and sufficient detail the three most important timescales: the Rayleigh time for liquid oscillations, the solidification time over which such oscillations are trapped in a solid state, and the heat conduction time which is the overall "process bottleneck" being the slowest time. Now that a proper understanding of the characteristic times and the sampling rates has been established, it is possible to look at specific sensors, sensor configurations, and resultant data collected in the real-time environment so as to answer both questions of whether the process is under control and how to control the process.

Real-Time Measurements Relevant to Quality

Figure 21:
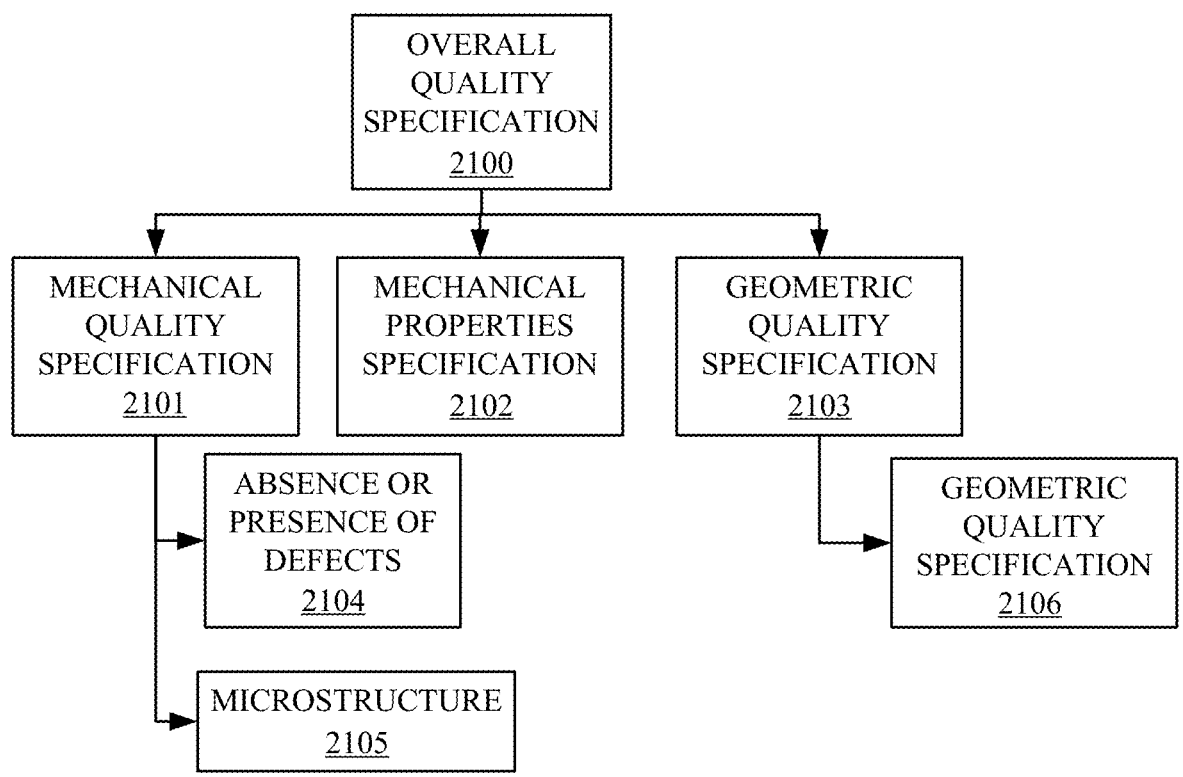
FIG. 21 shows a block diagram reviewing the overall derivation of quality specifications and categorizes, the resultant measurements that must be incorporated in order to verify adherence to overall quality specification and hence to the original design intent.

Before any process can be controlled or could be deemed to be under a state of control, measurements that correspond to process attributes that actually determine quality should be ascertained. FIG. 21 reviews the overall derivation of quality specifications and categorizes the resultant measurements that should be incorporated in order to verify adherence to overall quality specification and hence to the original design intent. The quality specification 2100 is divided into three broad categories: a metallurgical quality specification 2101, a mechanical properties specification 2102, and a geometric quality specification 2103. The mechanical properties specification 2102 may not be directly measurable for additive manufacturing processes in real-time, but certain metallurgical factors such as the presence or absence of defects directly impacts mechanical properties as well. The geometric properties 2103 should ideally be measured in process and on the machine as the part is being built as well as post-process and after any additional thermal processing or heat treatment steps, i.e. both in-process as well as post process geometry measurements 2106. Upon close correlation between these in process and post process data sets it will be possible to utilize the in process data to be predictive of post process outcomes and therefore the in process data could be used both for ascertaining a state of process control as well as implementing real time process control.

Going back to the metallurgical quality specification 2101, it in turn consists of two aspects, namely the presence or absence of defects 2104 and the microstructure 2105. Examples of defects include porosity and lack of fusion. Porosity is caused by one of two mechanisms. First, gas pockets which were in the powder bed can get trapped in the solid state if they do not have sufficient time to escape from the melt. This is a function of the beam interaction time and the capillary time. Generally at high temperature the viscosity drops off considerably and the capillary time will be very small. However if the temperature gradient is large and if the temperatures towards the bottom of the melt pool are lower, it is possible to have a range of effective capillary times such that there could be trapping of gas pockets subsurface and insufficient time for their escape as the beam moves by, even in subsequent re-melt passes. The second mechanism of porosity generation is through material vaporization, either the powder material itself in the case of many fine particles in the powder particle size distribution, or through vaporization of organic or inorganic or other foreign material that may be in the powders. The mechanism here is the differential solubility of gas in liquid vs. solid, and the fact that the solubility of gas in solid is generally far lower. As the material changes phase form liquid to solid, the gas would then be forced to come out of solution and would therefore form fine porosity.

With regards to the microstructure 2105, an important governing factor is that additive manufacturing requires a melting and solidification step as the key step to form a consolidated macrostructure with a given microstructure. Therefore the thermal history over fast and slower timescales is the most important governing factor that determines the metallurgical quality 2105.

On the basis of the discussions above it is seen that real-time measurements should focus on two broad categories: thermal measurements over various time scales, and geometric measurements of as-built geometry. Both of these will impact mechanical properties, but there is not a direct measure of material strength, fatigue life, etc. based on real-time signals alone. Post-process data such as the results of mechanical properties testing can be conducted to make the in-process real time data predictive.

There is a direct and deterministic correlation and connection between the underlying thermodynamics of the material system in questions (phase diagram) and the processing history that the material system underwent. In process and real time measurements track the evolution and the state of the processing history. However these measurements alone without additional phase diagram and thermodynamic guidance may not be sufficient to predict mechanical properties. Additional experimental, theoretical, modeling-based, or ab initio information regarding the material kinetics and specifically how various equilibrium or non-equilibrium phases are attained is essential to a full understanding of the mechanical properties. Therefore this invention will focus on two sets of real time measurements as predictive of quality (necessary but perhaps not completely sufficient to fully specific quality):

Thermal measurements over various timescales

Geometric measurements in real-time and in process.

Thermal Measurements and Metallurgical Quality

Generally, there are many different possible in-process physical measurements that could be performed on a manufacturing process. Some of these are listed in the table below which is a representative but not complete or exhaustive listing.

| SENSOR CATEGORY | SENSORS | PHYSICAL BEHAVIORS IT COULD MEASURE |
| --- | --- | --- |
| Force and vibration | Accelerometers vibration sensors mechanical shock sensors strain gages piezoelectric sensors | The uniformity of the powder addition process which typically involves a mechanical arm that spreads the powders. Any irregularities in the arm, the mechanical motion, the spreading action, or the arm hitting previously deposited layers could be important to indicate possible non-uniformities in the powder bed as a result of errors in this mechanical spreading action. |
| Contact thermal | thermocouples thermistors resistance thermal detectors (RTDs) | The powder bed temperature as well as other temperatures in the equipment, the processing chamber, or other aspects of the manufacturing process could be sensed and detected with these sensors. This kind of data is valuable to know the macro thermal state of the process as well as for machine diagnostics and preventative maintenance for the machine itself. |
| Non-contact thermal | single color pyrometer two or multi-color pyrometer thermal imaging camera ratio pyrometers fiber optic pyrometers | These sensors measure both process as well as ambient powder bed temperatures and could do so in the frame of reference of the laser or in a stationary reference frame. They can measure very fast thermal transients associated with heating, melting and cooling as well as slower thermal transients at longer timescales as was discussed previously. |
| Optical | photodiode spectrometer | These sensors could again be in a moving or a fixed reference frame. Photodiodes measure intensity of light emissions over a given range of wavelengths and could be correlated to such features as weld pool size and/or temperature. They could also detect anomalies such as regions where the laser power absorption suddenly changes, or areas where the power absorbed otherwise fluctuates. Spectrometers can also perform chemical analysis of the vaporized and either ionized or unionized plasmas or vapors associated with the additive manufacturing process |

| SENSOR CATEGORY | SENSORS | PHYSICAL BEHAVIORS IT COULD MEASURE |
|---|---|---|
| Optical | high speed camera camera linear camera other optical imaging systems | These types of sensors could be used again in the frame of reference of the beam or in a stationary frame. They could measure such things as weld pool size and shape, the shape and precise metrology of the layer just deposited, irregularities in the manufacturing process, the integrity of the powder bed as new powder layers are applied, as well as other nominal and off-nominal process conditions |
| Other | laser ultrasonic eddy current ultrasonic acoustic emission | This category of sensors involves other or multiple physical phenomena. For example the laser ultrasonic could involve a laser interferometer which could directly interrogate the manufacturing process, or in conjunction with an excitation source could be used to directly measure mechanical properties of the deposit as the process build is occurring. Eddy current sensors can similarly measure the integrity of the build if they are swept over the build up part. Similarly it may be possible to perform in-situ ultrasonic measurements. Acoustic emission measurements may be sensitive to high speed metallurgical phenomena such as dislocation motion and cracking and would be attached to the base of the part being built up |

For the purposes of this present invention, the range of sensors will be limited to those which can measure thermal phenomena. Also, these sensors could be in a moving frame of reference with respect to the beam (i.e. moving with the beam as it scans) or they could be in a stationary frame of reference. These two frames are more commonly known as Lagrangian or Eulerian respectively. Exemplary embodiments showing the above sensors arranged in an additive manufacturing environment have been depicted in FIGS. 3A and 3B.

Control Types and Examples

The following three types of process control can be applied to the described processes based at least in part upon the calibrated temperature data depicted in FIG. 19F: (1) Process Intervention, or the stopping or interruption of a process for cause based on one or more critical process features going out of a specified range; (2) Interlayer process control, or the alteration of process parameters between layers in an additive manufacturing process based on measurements made during the penultimate layer, quality or feature metrics calculated from such measurements, and a decision algorithm which decides if these features are within specified ranges and if they are not then how to make adjustments to process parameters such as heat source power and travel speed to get these features or quality metric back into their specified ranges; and (3) Intra-layer, or scan-level process control, in which power, travel speed or other process parameters could be changed so that certain quality metrics or features will remain within specified ranges.

The third form of process control is the fastest and requires the fastest control loop. The first form of process control may be viewed as an open loop control with only one outcome, i.e. the process is halted when conditions are seen to drift too far from nominal. The second form is a slower form of real time control and only adjusts parameters on a layer by layer basis.

Figure 22:
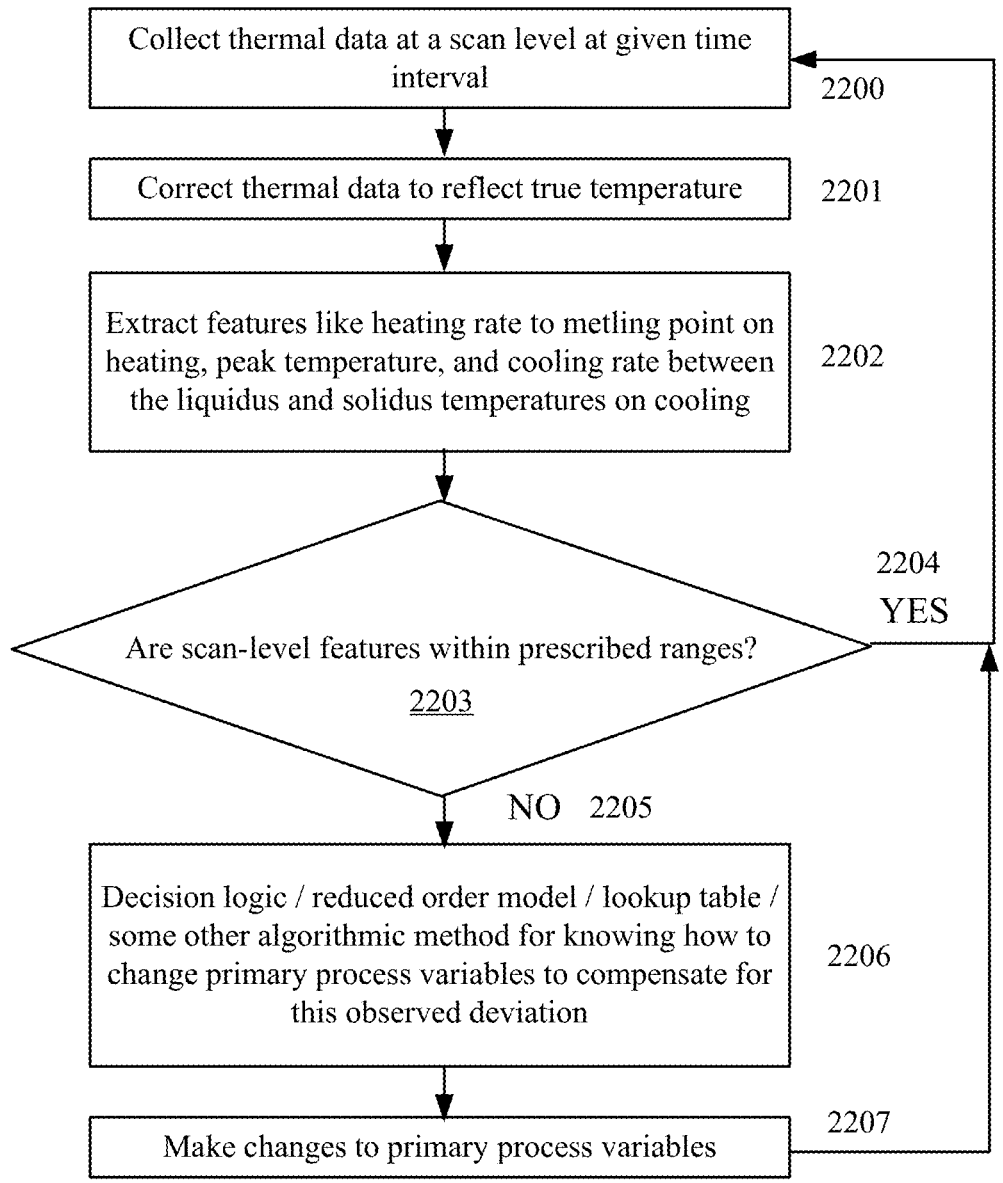
FIG. 22 shows a high level process control flow chart.

FIG. 22 shows a high level process control flow chart which utilizes the process features discussed previously. This diagram shows the process flow for the case of intra-layer or scan by scan control. In such control, a single scan is conducted, calculations are made, and if necessary adjustments are made prior to the next scan. This is therefore envisioned as a fast control loop which makes changes in a millisecond or potentially less. At 2200 thermal measurements are taken using a variety of thermal sensors. These thermal measurements are corrected according to the process flow chart shown in FIG. 18. Then features are extracted such as those discussed above which could include, but are not limited to, such features as the heating rate up to the liquidus temperature on heating, the peak temperature, and the cooling rate between the liquidus and solidus on cooling. These are features that have metallurgical significance for the material and the as-deposited additive manufacturing buildup.

Then at 2203, it is seen whether or not these features are within the prescribed ranges that are known to correspond to nominal process behavior and are known to produce acceptable parts. If the answer is yes, then at 2204 the process continues to the next scan with the same process variables/process parameters. Note that there could be hundreds or thousands of scans within a single layer of an AM part, and there could be thousands of such layers per part. If the result of the query posed in 2203 is no, then at 2205 the process flow is diverted to a decision at 2206. At 2206, some methodology that can make a decision based on the magnitude and direction of the deviations observed is applied. This decision logic could be a reduced order process model, or it could be a lookup table or database, or it could be some heuristic scheme like a neural network, or it could be any other algorithmic system that decides which process variables or process parameters to change, by how much, and in which direction (increase or decrease). For example, a change in process variables or process parameters can take the form of changes to the heat source heat output power, travel speed and scan pattern, which can alter the amount of energy introduced to one or more layers of a part. Then at step 2207 these new process parameters are utilized to make the next scan based on the data provided by the penultimate scan, and the process is repeated until the layer and ultimately the part is completed. Generally, increases in power and decreases in heat source travel speed result in greater amounts of heat being added to the part. By adding greater amounts of heat, the solidification rate actually decreases. So, to fix a condition in which solidification is occurring too rapidly, additional heat can be added to the system. Conversely, if solidification of the materials are happening too slowly, then an amount of energy delivered to the part can be reduced, which increases the rate at which solidification occurs. Generally speaker the rate at which the material solidifies is quite important as cooling rates too far out of bounds tend to degrade the quality of the finished part. Another way to adjust the amount of heat delivered to a particular layer or area is by adjusting the scan pattern. For example, a scan pattern with passes grouped closely together would deliver relatively more heat to the part than another laser otherwise using the same settings but with a broader scan pattern.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An additive manufacturing method, comprising:
monitoring a first portion of a build plane during an additive manufacturing operation using a first optical sensor;
simultaneously monitoring a second portion of the build plane that includes the first portion using a second optical sensor;
detecting a change in phase of material within the first portion as a heat source passes through the first portion of the build plane with the first optical sensor, wherein detecting the change in phase comprises at least one of identifying a thermal arrest or identifying a thermal inversion;
calibrating the second optical sensor by correlating the change in phase detected by the first optical sensor with information collected by the second optical sensor during the detected phase change, the calibrating of the second optical sensor improving characterization of a temperature of a region of the second portion of the build plane outside of a field of view of the first optical sensor; and
changing an amount of energy supplied within the region of the second portion by the heat source in accordance with the calibrated temperature information provided by the second optical sensor.

2. The additive manufacturing method of claim 1, wherein changing the amount of energy supplied by the heat source comprises shutting off the heat source.

3. The additive manufacturing method of claim 1, wherein changing the amount of energy supplied by the heat source comprises increasing an amount of heat supplied by the heat source in response to detecting solidification of the material within the first portion of the build plane.

4. The additive manufacturing method of claim 1, wherein the first optical sensor is a single color pyrometer.

5. The additive manufacturing method of claim 4, wherein the single color pyrometer detects both melting and solidification of the material within the first portion.

6. The additive manufacturing method of claim 4, wherein an on heating liquidus temperature is identified by taking a derivative of the temperature and correlating the on heating liquidus temperature with a greatest value from the temperature derivative.

7. An additive manufacturing system, comprising:
a processor;
a heat source configured to direct energy towards a layer of powder arranged on a powder bed in a pattern defined by the processor that corresponds to a shape of a part;
a first optical sensor configured to determine a temperature associated with a fixed portion of the layer of powder; and
a second optical sensor configured to simultaneously receive light emitted by a portion of the layer of powder being melted by the energy from the heat source, wherein the processor is configured to:
receive sensor data from the first and second optical sensors during an additive manufacturing operation,
calibrate the sensor data from the first optical sensor by identifying one or more phase changes during an additive manufacturing operation, wherein identifying one or more phase changes comprises at least one of identifying a thermal arrest or identifying a thermal inversion, and
correlate the calibrated sensor data from the first optical sensor with the sensor data from the second optical sensor to characterize temperatures of the part outside of the fixed portion of the layer of powder,
send a signal to the heat source to change the amount of energy applied to the layer of powder in response to the calibrated data.

8. The additive manufacturing system of claim 7, wherein the calibrated sensor data indicates a rate at which one or more of the phase changes is occurring is off-nominal.

9. The additive manufacturing system of claim 8, wherein the processor is further configured to periodically calibrate the sensor data throughout the additive manufacturing operation so that any fluctuations in the application of the energy by the heat source are recorded for characterizing an overall quality of a part produced by the additive manufacturing operation.

10. The additive manufacturing system of claim 7, wherein the first optical sensor is a pyrometer and the second optical sensor is a photodiode.

11. The additive manufacturing system of claim 10, wherein the photodiode is configured as a Eulerian sensor and is able to detect heat emitted from the layer of powder in the powder bed.

12. The additive manufacturing system of claim 10, wherein the photodiode is configured as a Lagrangian sensor and shares optics with the heat source.

13. The additive manufacturing system of claim 7, wherein the fixed portion of the layer of powder is outside of the shape of the part.

14. The additive manufacturing system of claim 7, wherein the fixed portion of the powder bed corresponds to portion of the part that is from the-part.

15. The additive manufacturing system of claim 7, wherein an area across which the first optical sensor measures temperature is larger than an area that is heated by the heat source.

* * * * *